United States Patent [19]

Nakano

[11] Patent Number: 5,191,373
[45] Date of Patent: Mar. 2, 1993

[54] DISPLAY SYSTEM OF A CAMERA SELECTIVE DISPLAY SYSTEM FOR A CAMERA

[75] Inventor: Satoshi Nakano, Tokyo, Japan

[73] Assignee: Asahi Kogaku Kogyo Kabushiki Kaisha, Tokyo, Japan

[21] Appl. No.: 879,726

[22] Filed: May 6, 1992

Related U.S. Application Data

[63] Continuation of Ser. No. 576,073, Aug. 31, 1990, abandoned.

[30] Foreign Application Priority Data

Aug. 31, 1989 [JP] Japan ............... 1-102292[U]

[51] Int. Cl.$^5$ ..................................... G03B 17/18
[52] U.S. Cl. ............................................ 354/474
[58] Field of Search ............ 354/471, 474, 475, 289.1, 354/289.12; 340/711, 712, 715; 352/140

[56] References Cited

U.S. PATENT DOCUMENTS

| | | | |
|---|---|---|---|
| 4,114,995 | 9/1978 | Stieringer et al. | 352/170 |
| 4,173,401 | 11/1979 | Harvey | 354/289.1 X |
| 4,397,533 | 8/1983 | Naruse et al. | 354/289.1 X |
| 4,483,601 | 11/1984 | Sekida et al. | 354/289.1 X |
| 4,647,176 | 3/1987 | Shimizu et al. | 354/471 |
| 4,710,008 | 12/1987 | Tosaka et al. | 354/289.1 |
| 4,847,651 | 7/1989 | Izumi et al. | 354/475 |

FOREIGN PATENT DOCUMENTS 0325229  7/1989  European Pat. Off. .

*Primary Examiner*—W. B. Perkey
*Attorney, Agent, or Firm*—Sandler, Greenblum & Bernstein

[57] ABSTRACT

A display system of a camera, for displaying photographing data or information relating to the camera, on a display unit disposed in a main body of the camera is provided. The photographing data or information is divided into sub-title data or information to be displayed as a plurality of sub-title data or information. The camera includes an information display changeover mechanism for selecting and displaying the sub-title data or information and the subordinate data or information on the display unit.

20 Claims, 31 Drawing Sheets

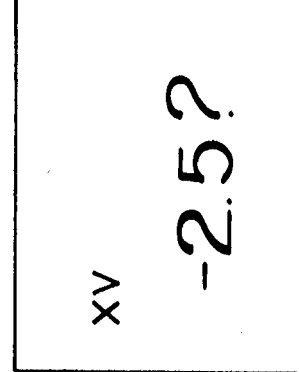
Fig-14C
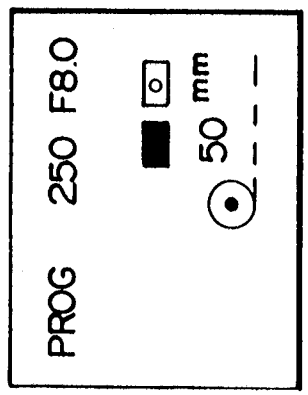
Fig-13D
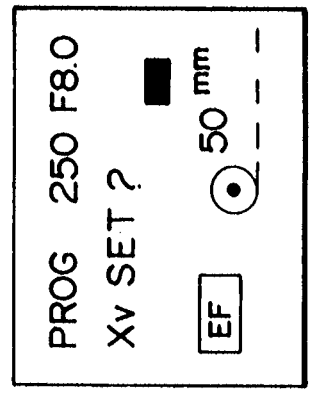
Fig-14B
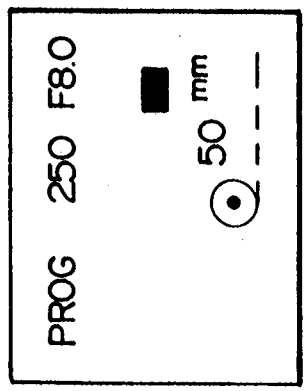
Fig-13C
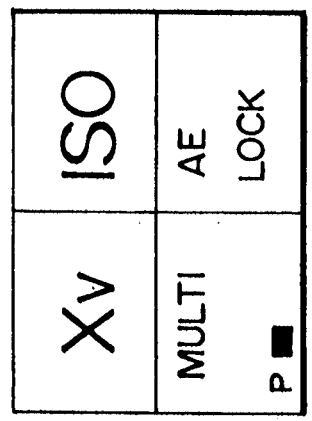
Fig-14A
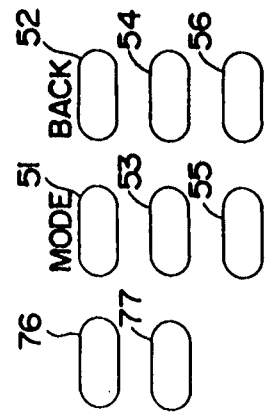

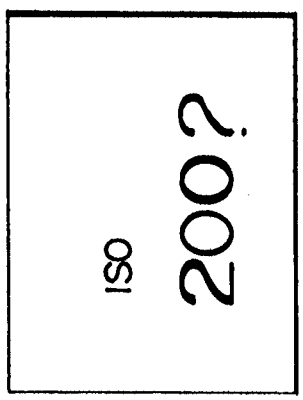
Fig-15C
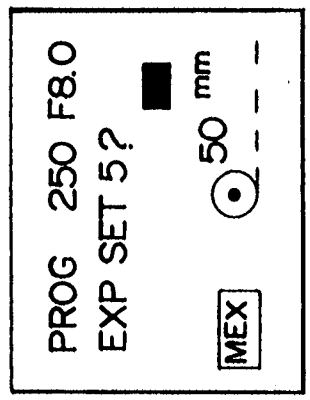
Fig-16C
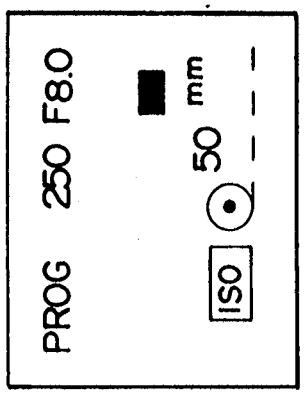
Fig-15B
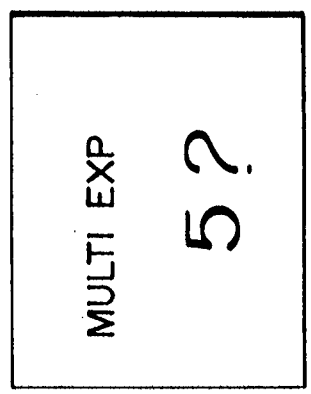
Fig-16B
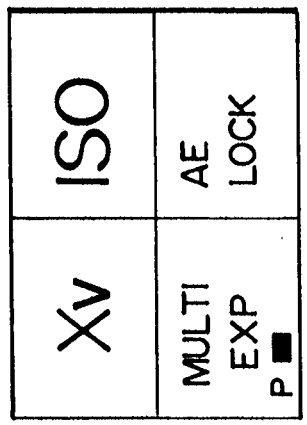
Fig-15A
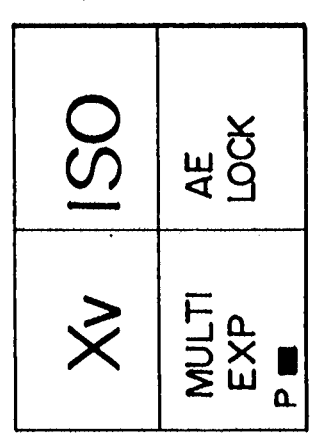
Fig-16A
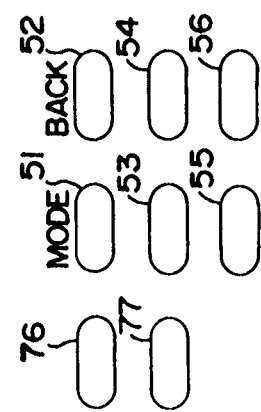
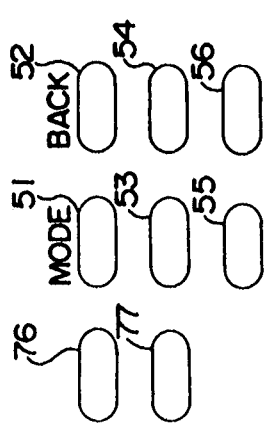

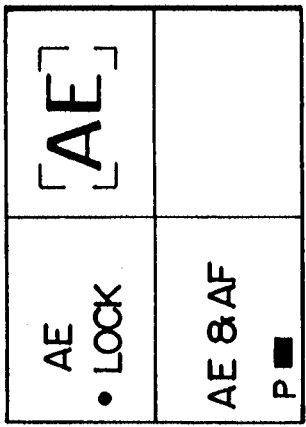
Fig-17B
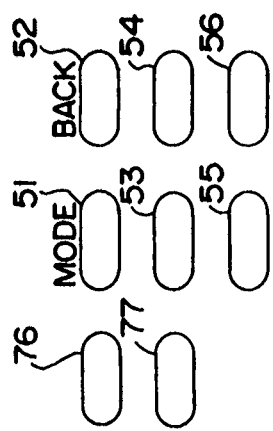
Fig-17A
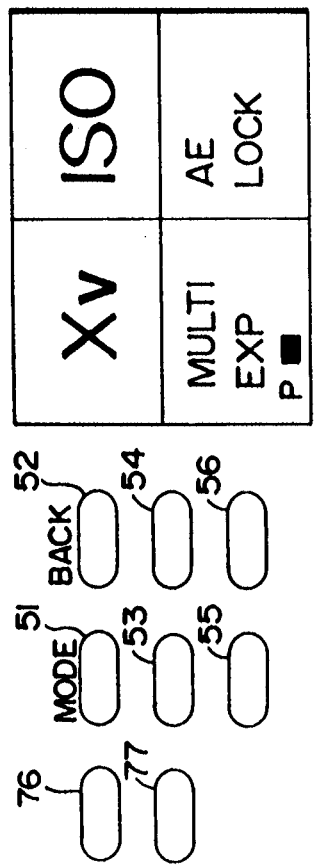
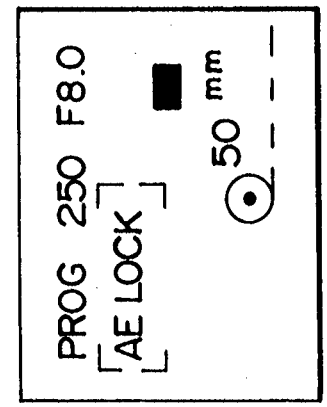
Fig-17E
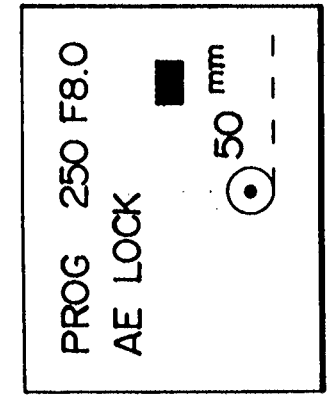
Fig-17D
Fig-17C

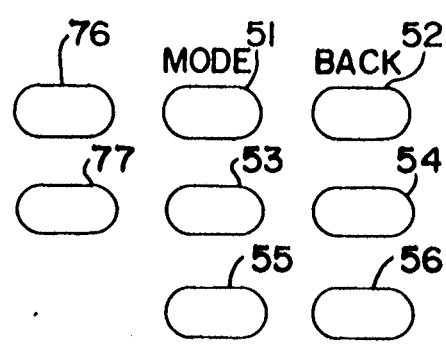
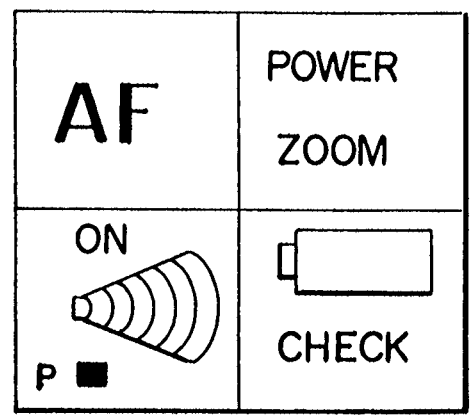
Fig-20A
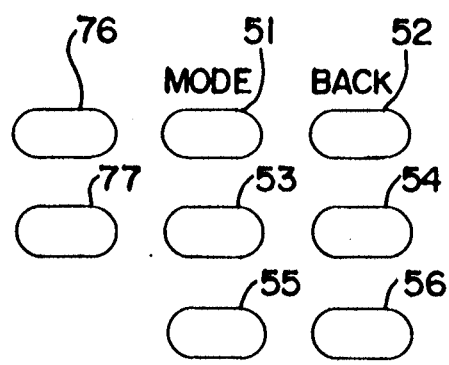
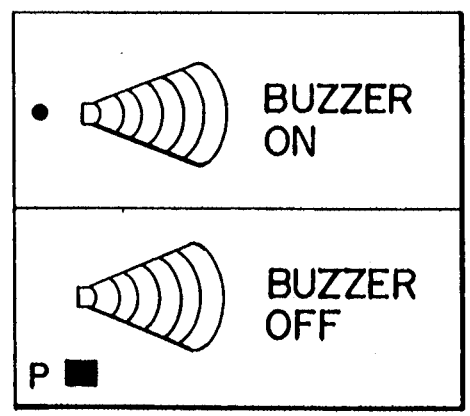
Fig-20B
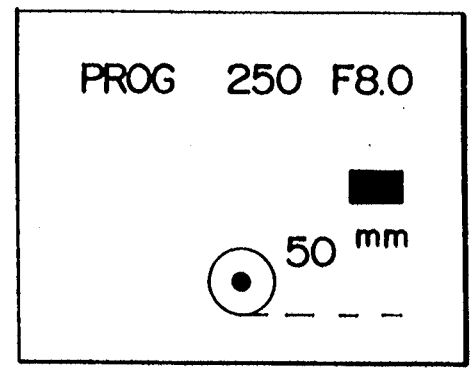
Fig-20C

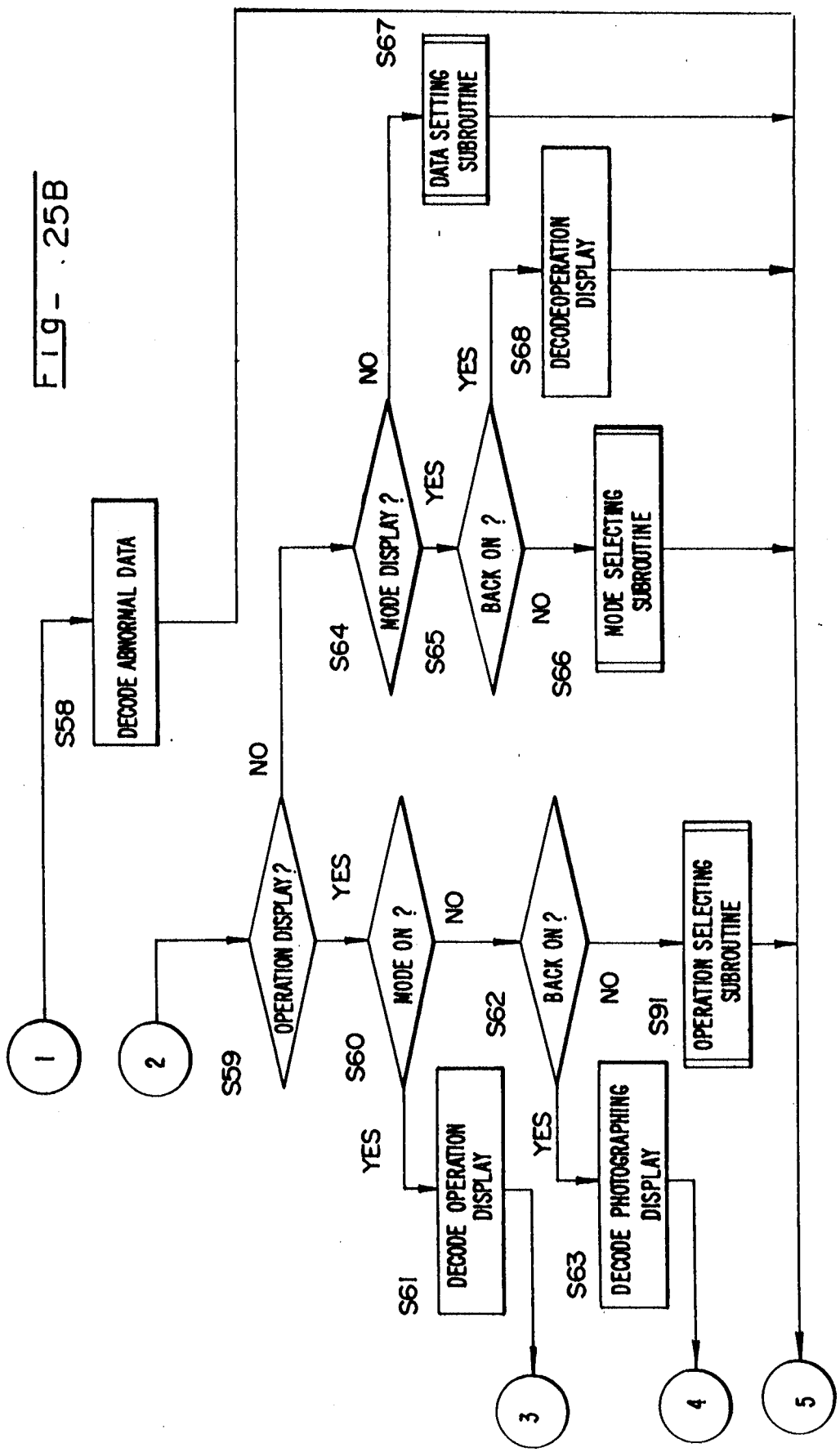

DISPLAY SYSTEM OF A CAMERA SELECTIVE DISPLAY SYSTEM FOR A CAMERA

This application is a continuation of application Ser. No. 07/576,073, filed Aug. 31, 1990, now abandoned.

BACKGROUND OF THE INVENTION

1. Field of the Invention

The present invention relates to a display system of a camera and, more particularly, to a display system of the camera with a display unit capable of displaying a variety of information necessary for photographing.

2. Description of Related Art

As the automation of cameras has developed to a great extent recent years, a camera with an automatic focus unit and an automatic exposure unit has come into common use. Recently, however, further functions such as short focusing time and improvement of focusing precision have become more and more in demand. In addition to the above, there is a need for a camera with a large-size display unit which is capable of displaying at a glance, a variety of information regarding photographing, such as various complicated program exposure modes such as a shutter speed priority mode for a telephotographic lens and a subject depth of-field priority mode for a wide angle lens, the number of pictures photographed, a program mode, and so on.

To meet this demand, there has been developed a camera having a liquid crystal display mounted to a main body of the camera so as to display exposure modes such as manual, auto, program, bulb exposure and so on, or shutter speed, the number of pictures photographed or the like.

Although the of photographing mode can be altered by operation of a select switch while viewing information regarding the camera, displayed on a liquid crystal display, however, such a camera suffers from the disadvantages that information is displayed in too small of a size and it is hard to carry out operation at the time of setting a mode.

SUMMARY OF THE INVENTION

The present invention has been developed to solve the problems associated with conventional cameras. The present camera provides a display system which allows information on the camera to be displayed on a display unit in such a manner as to be readily visualized, and further has an improved operability at the time the photographing mode and other modes are set.

In order to achieve the above, the present invention consists of a display system of a camera for displaying photographing data or information relating to the camera on a display unit disposed in a main body of the camera. The photographing data or information is divided into sub-title data or information to be displayed by a plurality of sub-titles, and subordinate data or information subordinate to the sub-title data or information. There is further provide an information display changeover means for selecting and displaying the sub-title data or information and the subordinate data or information on the display unit.

The above arrangement for the display system of the camera permits the sub-title information concerning a photographing mode or the like to be displayed on the display unit by altering the subtitle information by a simple operation. The photographer can thus find out the desired sub-title information quickly and readily while visualizing the sub-title information on the display unit at the time of setting a mode. Further, when the photographer has selected the desired sub-title information, detailed information concerning the desired sub-title information selected can be displayed quickly on the display unit so that visualizability can be improved, together with operability, thereby lightening the burden imposed on the photographer at the time a mode is set.

BRIEF DESCRIPTION OF THE DRAWINGS

FIG. 7B is a diagrammatic representation of a display of the display titles on the four-divided regions of the dot LCD, which has been changed from the status of FIG. 7A by turning an UP switch on.

FIG. 7C is a diagrammatic representation of a display of the displayed titles on the four-divided regions of the dot LCD, which has further been changed from the status of FIG. 7B by turning the UP switch on.

FIGS. 12C to 12F, inclusive, are diagrammatic representations of the displays on the screen of the dot LCD when changed from the status of FIG. 12B by appropriately turning the respective switches on.

FIGS. 13C and 13D, inclusive, are diagrammatic representations of the displays on the screen of the dot LCD when changed from the status of FIG. 13B by appropriately turning the respective switches on.

FIG. 14A is a diagrammatic representation of a display of the four-divided regions of the dot LCD prior to operation of an "Xv mode", on each of which a title is displayed, and the arrangement for the switches for operating the dot LCD.

FIGS. 14B and 14C, inclusive, are diagrammatic representations of the displays on the screen of the dot LCD when changed from the status of FIG. 14A by appropriately turning the respective switches on.

FIG. 15A is a diagrammatic representation of a display of the four-divided regions of the dot LCD prior to operation of an "ISO setting mode", on each of which a title is displayed, and the arrangement for the switches for operating the dot LCD.

FIGS. 15B and 15C, inclusive, are diagrammatic representations of the displays on the screen of the dot LCD when changed from the status of FIG. 15A by selectively turning the respective switches on at an appropriate timing.

FIG. 16A is a diagrammatic representation of a display of the four-divided regions of the dot LCD prior to operation of a "multi-exposure mode", on each of which a title is displayed, and the arrangement for the switches for operating the dot LCD.

FIGS. 16B and 16C, inclusive, are diagrammatic representations of the displays on the screen of the dot LCD when changed from the status of FIG. 16A by selectively turning the respective switches on at an appropriate time.

FIG. 17A is a diagrammatic representation of a display of the four-divided regions of the dot LCD prior to operation of an "AE lock mode", on each of which a title is displayed, and the arrangement for the switches for operating the dot LCD.

FIG. 17B is a diagrammatic representation of a display of the four-divided regions thereof on each of which a title is displayed when the display status has been changed from the status of FIG. 17A by turning an operating switch on, and the arrangement of the operating switches corresponding thereto.

FIGS. 17C through 17E, inclusive, are diagrammatic representations of the displays on the screen of the dot LCD when changed from the status of FIG. 17B by selectively turning the respective switches on at an appropriate time.

FIGS. 18C, 18E and 17G are diagrammatic representations of the displays on the screen of the dot LCD when changed from the status of FIG. 18B by selectively turning the respective switches on at an appropriate time.

FIG. 20A is a diagrammatic representation of a display of the four-divided regions of the dot LCD prior to operation of a "buzzer operating mode", on each of which a title is displayed, and the arrangement for the switches for operating the dot LCD.

FIG. 20B is a diagrammatic representation of a display of the two-divided regions thereof on each of which a title is displayed when the display status has been changed from the status of FIG. 20A by turning an operating switch on, and the arrangement of the corresponding operating switches.

FIG. 20C is a diagrammatic representation of the display on the screen of the dot LCD when changed from the status of FIG. 20B by selectively turning the corresponding switch on at an appropriate time.

FIGS. 25A and 25B represent a flow chart showing the operation of "switch data processing".

DETAILED DESCRIPTION OF THE PREFERRED EMBODIMENTS

The present invention will now be described in more detail by way of examples in conjunction with the accompanying drawings.

Figure 1:
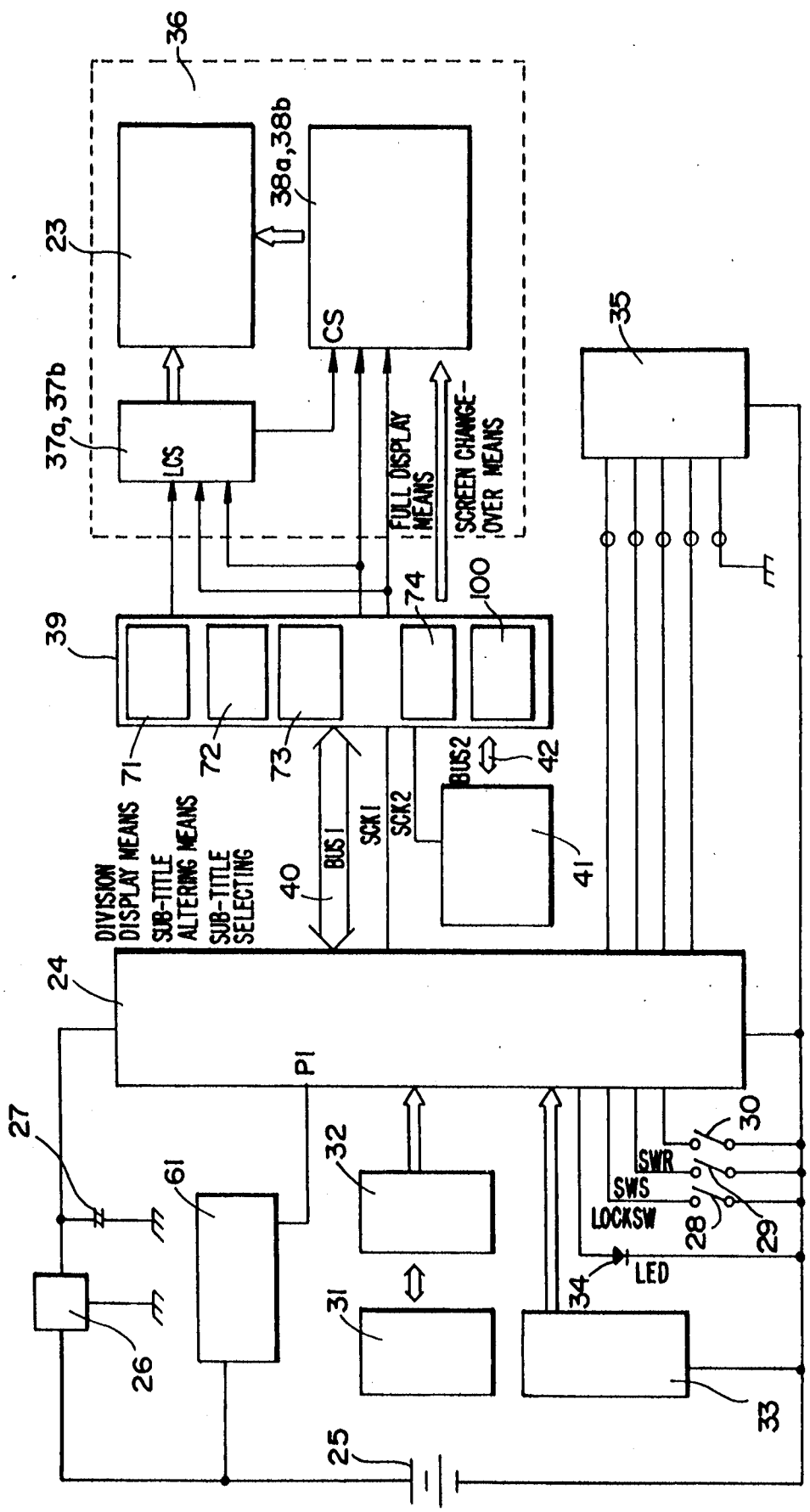
FIG. 1 is a diagrammatic representation of a control block of a display system of a camera according to the present invention.

A control circuit of the camera to which the display system according to the present invention is applied will now be described with reference to FIGS. 1 and 4.

The camera 21 has an automatic focus (AF) unit, an automatic loading, winding and rewinding unit, an automatic exposure (AE) unit, and so on, and its basic operation is carried out in substantially the same manner as conventional cameras. The camera 21 is further provided with a pentagonal roof prism unit 21a (FIG. 4) with a dot liquid crystal display (LCD) 23 for displaying data or information on the camera.

The control circuit has a control microcomputer 39 for controlling the dot LCD 23 and a central processing unit (CPU) 24 to which electric power is supplied from a battery 25 through a regulator 26. The control circuit further contains a lock switch 28, a photometric switch 29, and a release switch 30. When the lock switch 28 and the photometric switch 29 or the release switch 30 are turned on, a P1 joint of the CPU 24 is arranged so as to be at a low level, thereby starting a DC/DC converter 61 and supplying electric power to each unit. In FIG. 1, reference numeral 27 denotes a super capacitor (condenser) which serves to prevent a rapid drop of the voltage of the battery 25. Further, in the drawing, reference numeral 31 denotes a charge-coupled device (CCD) image sensor, reference numeral 32 denotes a CCD treating circuit, reference numeral 33 denotes a switch box, reference numeral 34 denotes a light emitting diode, and reference numeral 35 denotes an in-lens read-only memory (ROM). As shown in FIG. 1, a display box 36 contains row drivers 37a and 37b, a dot liquid crystal display (LCD) 23, and column drivers 38a and 38b. The LCD control microcomputer 39 is connected to the CPU 24 through a bus 40 and has a built-in, display random access memory (RAM) which is designed so as to transmit data to the column drivers 38a and 38b in a constant cycle and to generate a timing signal to both the row drivers 37a and 37b followed by driving the dot LCD 23.

From the CPU 24 to the LCD control microcomputer 39, there is transmitted display data on the basis of a transfer clock signal SCK1 through the bus 40. The display data includes various ones such as, for example, exposure mode Tv, Av, ISO, and Xv.

More specifically, the display RAM of the LCD control microcomputer 39 converts the data transferred from the CPU 24 into a display RAM data for displaying on the dot LCD 23. In this case, data of a character generator 41 is referenced as needed.

The data of the character generator 41 is transferred to the LCD control microcomputer 39 through a bus 42 on the basis of a transfer clock signal SCK2. This data is then logically added, together with the displaying RAM data, thereby providing a final display RAM data. A display RAM bit with respect to this data corresponds to one bit in the dot LCD 23.

Figure 2:
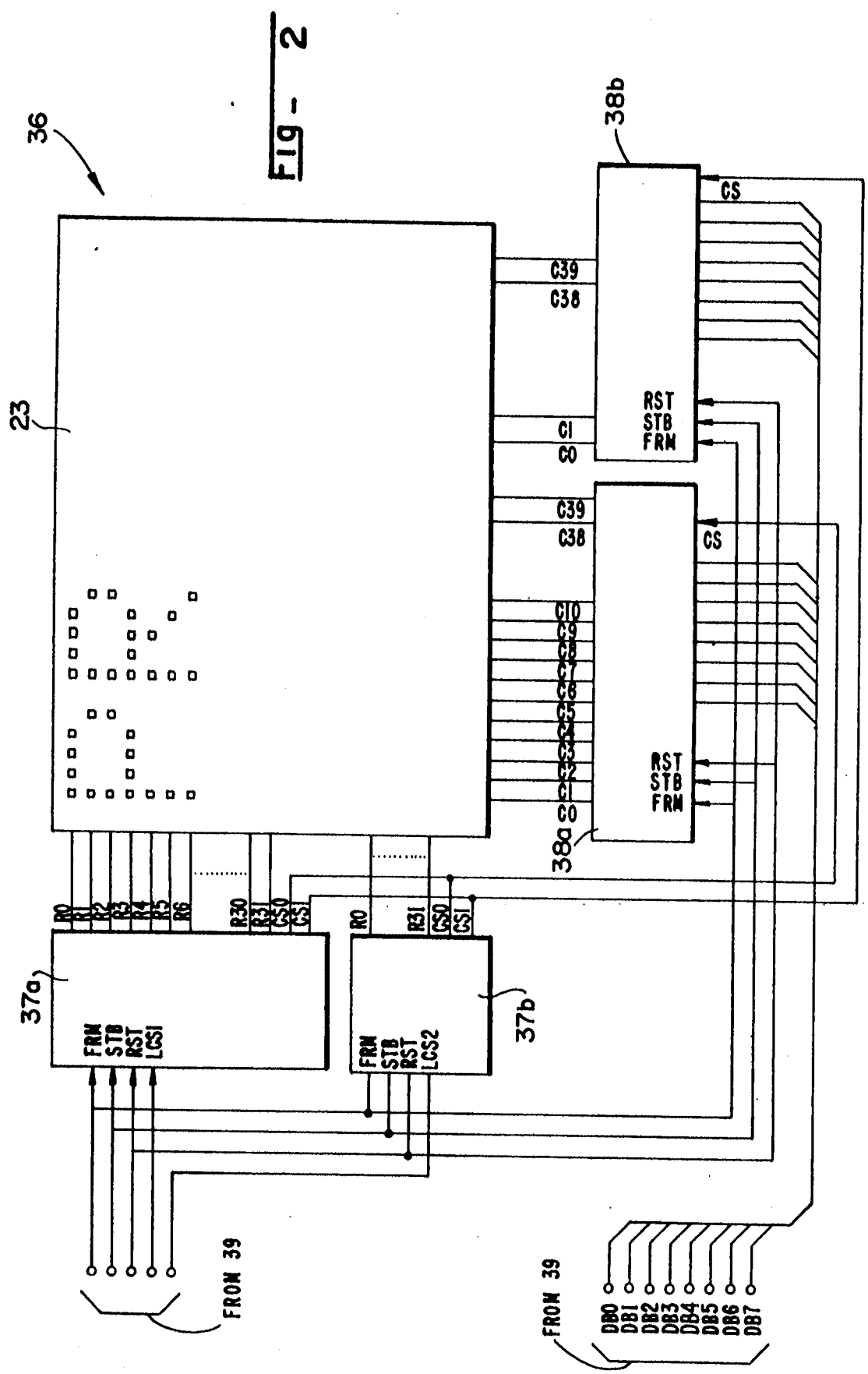
FIG. 2 is a diagrammatic representation of an enlarged essential portion of the control block of FIG. 1.

The display RAM data is transferred in a constant cycle to the column drivers 38a and 38b by means of the timing signal generated by the LCD control microcomputer 39. Chip selector CSO and CS1 of the respective row drivers 37a and 37b, as shown in FIG. 2, are terminals for selecting which column driver 38a or 38b has the data written.

As the LCD control microcomputer 39 generates a STB signal to the row driver 37a or 37b after the data has been written on the column driver 38a or 38b, the column driver 38a or 38b generates data corresponding to a display by one row. This allows the row driver 37a or 37b to be turned on by one row, thereby permitting a display by one row on the dot LCD 23. The repetition of this operation permits a display of each data on the dot LCD 23. In the drawing, reference alpha-numerals DBO to DB7, inclusive, denote data signal lines.

Figure 3:
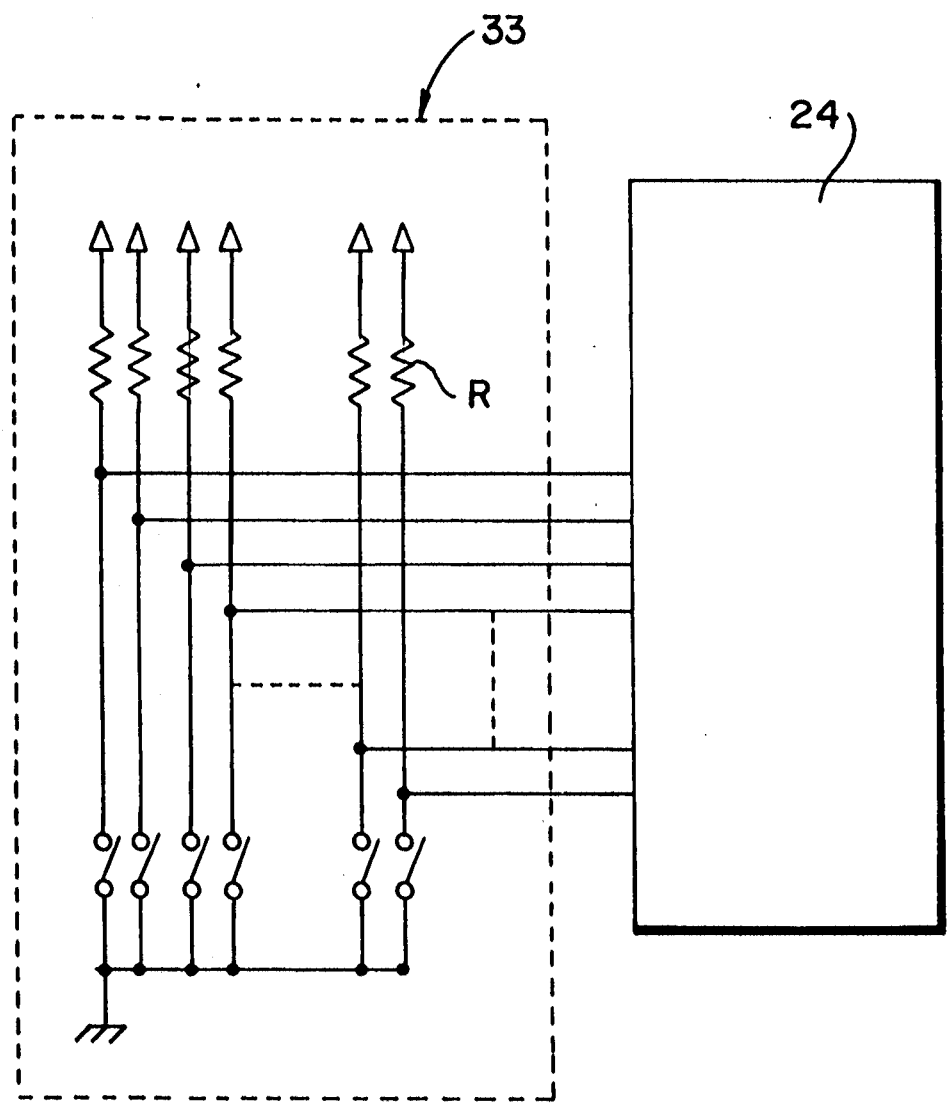
FIG. 3 is a diagrammatic representation of a detail of a switch box and a central processing unit (CPU) of the control block of FIG. 1.

FIG. 3 illustrates an example of the switch box having operating switches 51 to 56 and 76–77 (FIG. 6) for operating the dot LCD 23, respectively. A pull-up resistance R may be disposed on the side of the CPU 24 and may be constructed so as to be pulled up only to implement switch checking.

The control microcomputer 39 is provided with a division display means 71, a sub-title altering means 72, a sub-title selecting means 73, a full display means 74 and a screen changeover means 100. These means each have functions acting upon the dot LCD 23 through the display RAM.

The division display means 71 serves to divide the dot LCD 23 into plural regions (first region 23a, second region 23b, third region 23c and fourth region 23d, as shown in FIG. 8) and to display sub-title data or information in each of these regions. The sub-title data or information is one which displays a variety of photographing information by a plurality of sub-titles, and the content of the sub-title data or information is described in more detail by detail data or information located as subordinate information of the sub-title data or information.

The sub-title altering means 72 has the function of displaying sub-title data or information on a screen to be switched over by operation of the corresponding switch, when the sub-title data or information cannot be displayed on the first, second, third and fourth screen of another screen because the number of the sub-title data or information is more than the number of regions of the screen to be divided by the division display means 71.

The sub-title selecting means 73 serves to select either of the sub-title data or information displayed on the dot LCD 23 by the division display means when the corresponding switch is turned on.

The screen changeover means 100 serves to display the detail data or information as subordinate data or information of the selected sub-title data or information on the dot LCD 23 through the full display means 24 when either sub-title data or information is selected by the sub-title selecting means 73.

The full display means 74 has the function of combining each of the divided regions into one display on the basis of the screen changeover means 100.

Description will now be made of a specific display of data or information of the dot LCD 23 which serves as a display means of the present invention.

Figure 4:
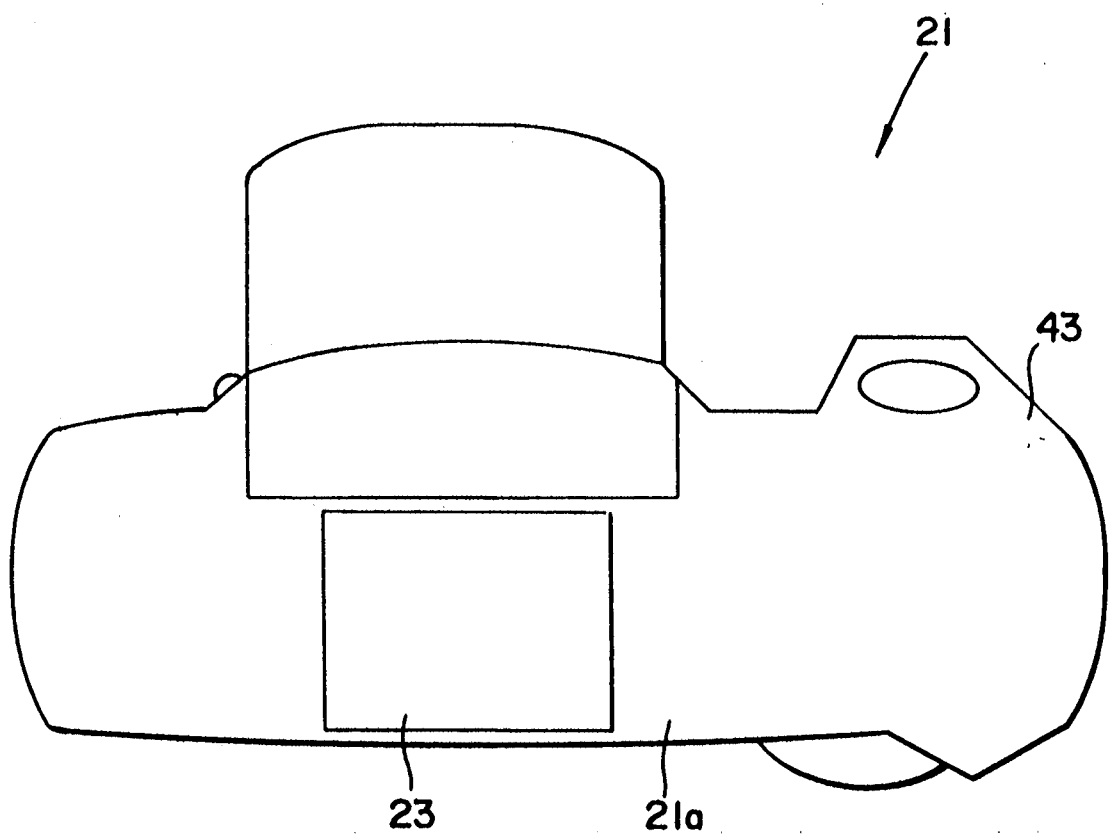
FIG. 4 is a plane view showing the camera to which the present invention is applied.

As shown in FIG. 4, the camera 21 comprises a camera body 43 which in turn is provided at its middle portion with the pentagonal roof prism unit 21a having the dot LCD 23 capable of displaying the data or information by dots.

Figure 5:
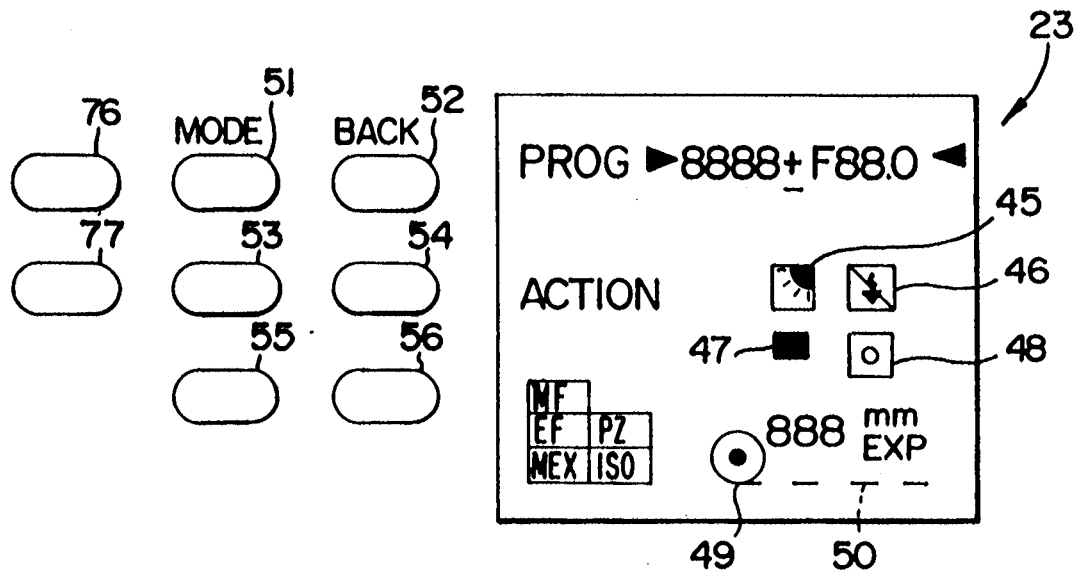
FIG. 5 is a diagrammatic representation of a display content of a dot liquid crystal display (LCD) and an arrangement of switches for operating the dot LCD of the camera.

FIG. 5 is a plane view showing the screen of the dot LCD 23 when all of the display is turned on. In a middle portion of the screen, the term "ACTION", indicative of an "action mode" is displayed in capital letters in a size larger than the other displays. In addition thereto, the screen displays a symbol 45 indicative of a "daytime synchronization mode", a symbol 46 indicative of an "automatic lighting inhibition mode", a symbol 47 indicative of a "drive mode", and a symbol 48 indicative of a "spot photometric mode". At a lower left-hand corner portion of the screen, there are displays of signs "MF", "EF", "PZ", "MEX" and "ISO". The sign "MF" is indicative of "Manual Focus mode"; the sign "PZ" is indicative of the "Power Zoom mode"; and the sign "MEX" is indicative of a "Manual Exposure". At a lower middle portion of the screen, a circle 49 denotes a patrone or cassette and the broken line denotes a film.

At a portion adjacent the dot LCD 23, there are disposed a MODE switch 51, a BACK switch 52, operating switches 53, 54, 55 and 56 (information display changeover means) for implementing setting operations, an UP switch 76, and a DOWN switch 77 (information display changeover means). These switches may also be disposed at another portion of the camera body.

Figure 6:
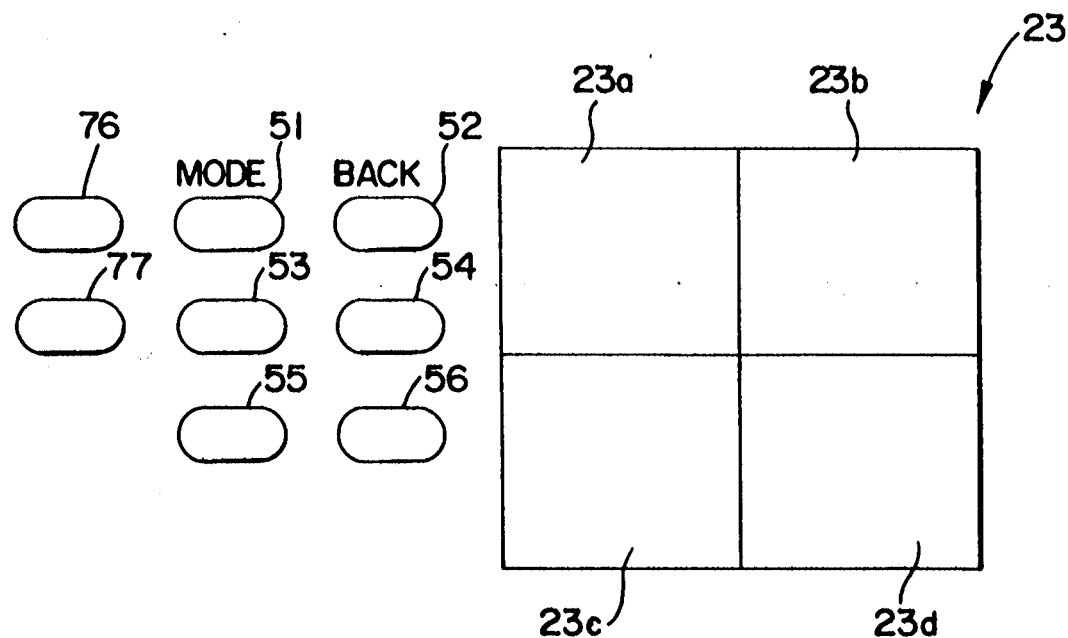
FIG. 6 is a diagrammatic representation of a four-way divided dot LCD and the arrangement of the switches corresponding to regions of the four-divided dot LCD.

As shown in FIG. 6, the screen of the dot LCD 23 is divided into four regions, i.e., first region 23a, second region 23b, third region 23c and fourth region 23d, by the division display means 71 by means of the corresponding switch.

The first region 23a alters its screen display in correspondence with operation of the operating switch 53. The display on the screen of the second region 23b is shifted by the corresponding operating switch 54. The third region 23c shifts a display on its screen by operation of the corresponding operating switch 55. The display on the screen of the fourth region 23d is shifted by means of the corresponding operating switch 56.

Description will now be mode of a shift of the screen by operation of the UP switch 76 and the DOWN switch 77 with reference to FIGS. 7A to 8B.

Figure 7A:
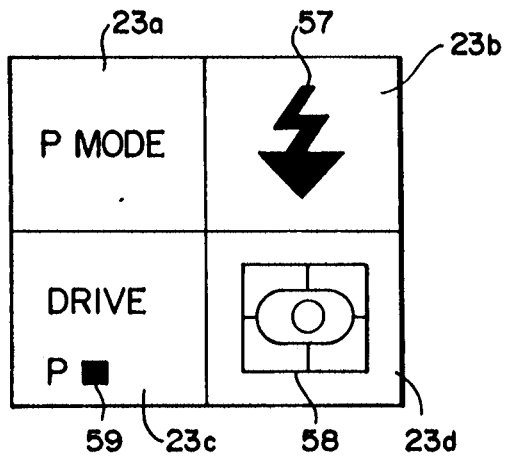
FIG. 7A is a diagrammatic representation of a display of the four-divided regions prior to operation of the dot LCD, on each of which a title is displayed.

FIG. 7A indicates a display, prior to operation on the screen of the dot LCD 23 which is divided into four regions by the division display means 71. In this status as shown in FIG. 7A, the division display means 71 when the lens switch (not shown) is changed to AUTO-side displays a a sign "P MODE" on the divided screen of the first region 23a, a symbol 57 for the stroboscope operating mode on the divided screen in the second region 23b, a sign "DRIVE" indicative of the drive mode on the divided screen of the third region 23c, and a symbol 58 for a divided photometry on the screen in the fourth region 23d.

Figure 7B:
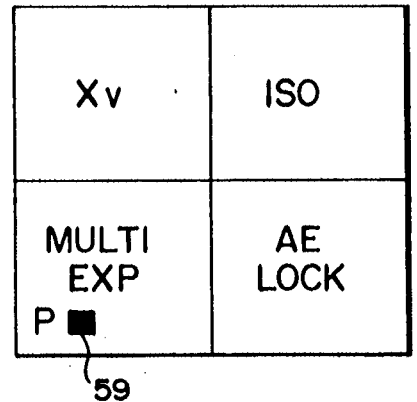

By turning the UP switch 76 on in the status shown in FIG. 7A, the screen is changed over to the screen as shown in FIG. 7B on the basis of the sub-title altering means 72. On the screen in this status, a sign "Xv" is displayed on the first region 23a and the sign "ISO" is displayed on the second region 23b. On the screen in the third region 3c a sign "MULTI EXP" is displayed, while a sign "AE LOCK" is displayed on the screen in the fourth region 23d. In the above displays, the sign "Xv" is indicative of a width of changes in exposure (exposure multiplication) at the time of an "MAB mode", in which the term "MAB" means "Multi Auto Bracketing". This MAB mode is a mode in which a given number of pictures are photographed while stepwise changing exposure values. The sign "MULTI EXP" indicates a multiple exposure.

On the other hand, turning the DOWN switch 77 on in the status a shown in FIG. 7B returns the screen to the status a shown in FIG. 7A.

Figure 7C:
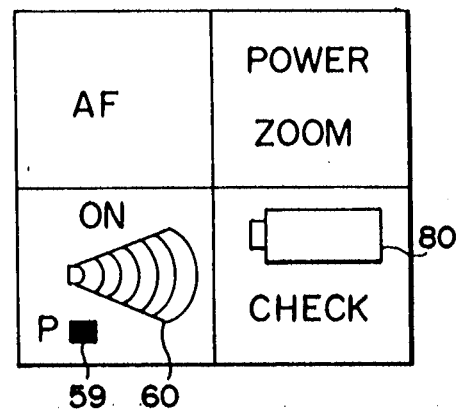

When the UP switch 76 is further turned on in the status shown in FIG. 7B, the screen is changed over to the status a shown in FIG. 7C. In this status, a sign "AF" indicative of an Automatic Focus mode is displayed on the screen in the first region 23a, and the sign "POWER ZOOM" is displayed on the screen in the second region 23b. The screen in the third region 23d displays a sign "ON", a symbol 60 indicative of the buzzer setting mode, a sign "P" and a symbol 59. The fourth region 23d has a mark 80 indicative of a battery and a sign "CHECK" displayed.

Figure 8A:
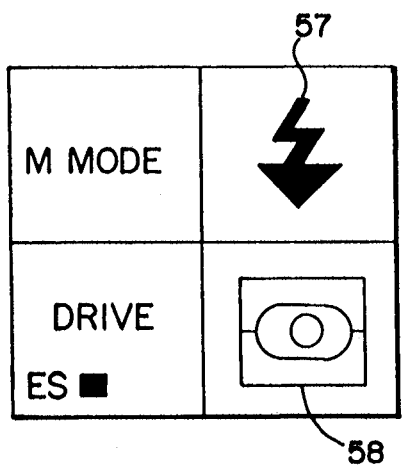
FIGS. 8A and 8B are diagrammatic representations of displays of the four-divided regions prior to other operations of the dot LCD, on each of which a title is displayed.

When the DOWN switch 77 is turned on together with the mode switch 51 in the status as shown in FIG. 7B, the screen is shifted to the status as shown in FIG. 8A on the basis of the sub-title altering means 72 when a lens switch is set to work automatically. This screen is an indication for pre-operation when the lens switch is changed to MANUAL-side and is substantially the same as the screen prior to operation, as shown in FIG. 7A, except for a display of an "M MODE" in the first region 23a in place of the "P MODE" and a symbol "ES" in the third region 23c in place of the symbol "P". By turning the UP switch 76 on in the status as shown in FIG. 8A, the screen is returned to a display of the screen as shown in FIG. 7B on the basis of the sub-title altering means 72.

Figure 8B:
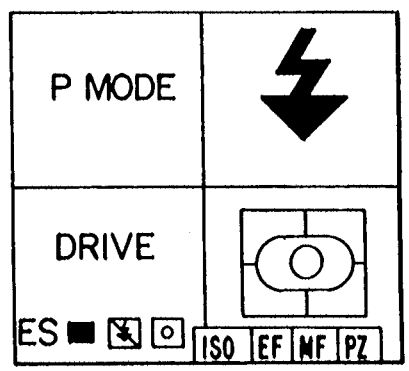

When the lens switch is set to work manually, turning the DOWN switch 77 on from the display as shown in FIG. 7B shifts the screen in the status as shown in FIG. 8B on the basis of the sub-title altering means 72.

Description will now be made of the instance of operation in the "exposure setting mode" with reference to FIGS. 9A to 9H, inclusive.

Figure 9A:
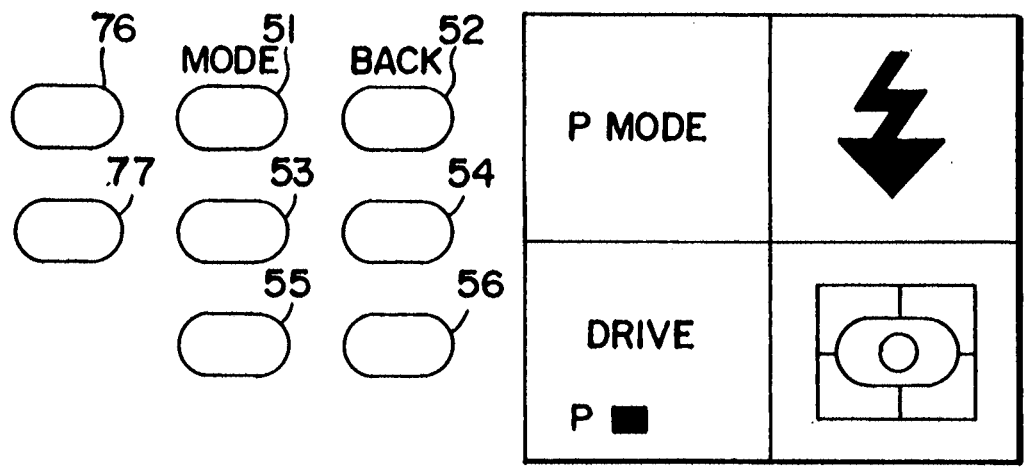
FIG. 9A is a diagrammatic representation of a display of the four-divided regions of the dot LCD prior to operation of an "exposure setting mode", on each of which a title is displayed, and the arrangement for the switches for operating the dot LCD.

FIG. 9A is a display on the screen prior to operation when changed over to a "lens auto mode". When the operating switch 53 is operated to turn on the screen as shown in FIG. 9A, the "P MODE" displayed on the screen in the first region 23a is selected by the sub-title selecting means 73, thereby displaying its subordinate data or information in the corresponding regions on the screen displaying the setting of the "exposure mode", as shown in FIG. 9B.

Figure 9B:
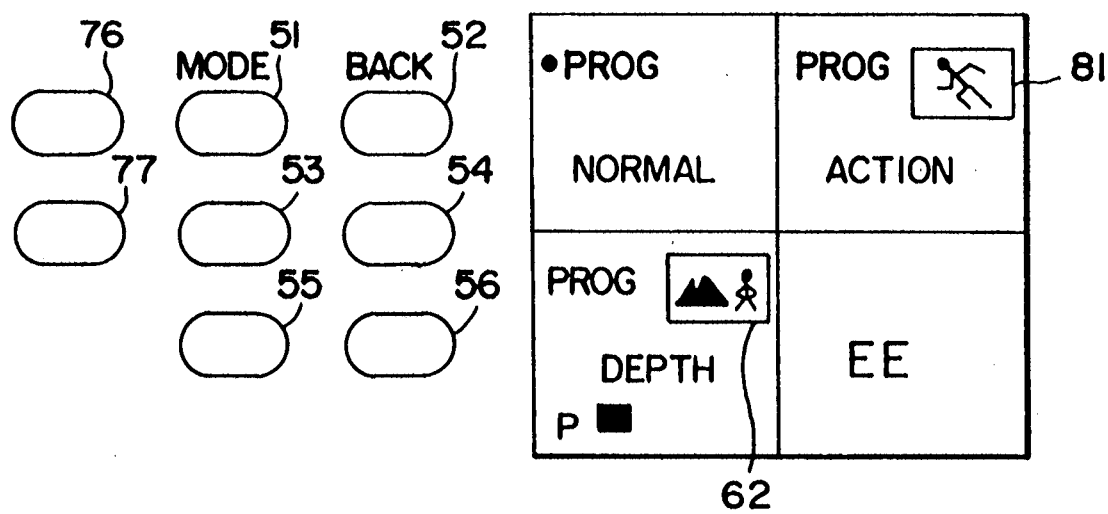
FIG. 9B is a diagrammatic representation of a display of the four-divided regions thereof on each of which a title is displayed, when the display status has been changed from the status of FIG. 9A by turning an operating switch on, and the arrangement for the corresponding operating switches.

On the screen as shown in FIG. 9B, a sign "PROG NORMAL" is displayed in the first region 23a while a sign "PROG ACTION" and a symbol 81 representing an action mode (high-speed shutter priority program) are displayed in the second region 23b. The screen in the third region 23c displays a sign "PROG DEPTH" and a symbol 62 indicative of the field depth priority program, and the screen in the fourth region 23d displays a sign "EE".

Figure 9C:
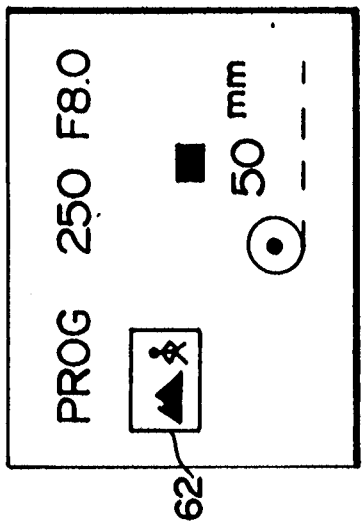
FIGS. 9C to 9F, inclusive, are diagrammatic representations of the displays on a screen of the dot LCD when changed from the status of FIG. 9B by selectively turning the respective switches on at an appropriate time.

By turning the operating switch 53 on in the status as shown in FIG. 9B, the dot LCD 23 divided into four sections is changed over to one full screen as shown in FIG. 9C on the basis of the full display means 74. On this screen, the detail data or information concerning the selected sub-title data or information is displayed by means of the full display means 74 on the basis of the screen changeover means 100, thereby displaying the screen for setting a "program normal mode".

Figure 9D:
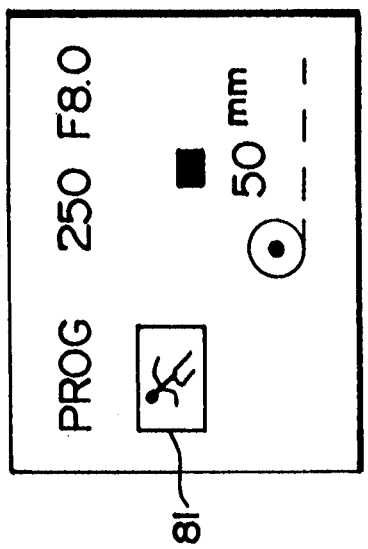

When the operating switch 54 is turned on from the status as shown in FIG. 9B, the four-divided dot LCD 23 is switched over to one full screen as shown in FIG. 9D on the basis of the full display means 74. This screen displays the detail data or information relating to the selected sub-title data or information by means of the full display means 74 on the basis of the screen changeover means 100, thereby displaying the display screen for setting a "program mode 2".

Figure 9E:
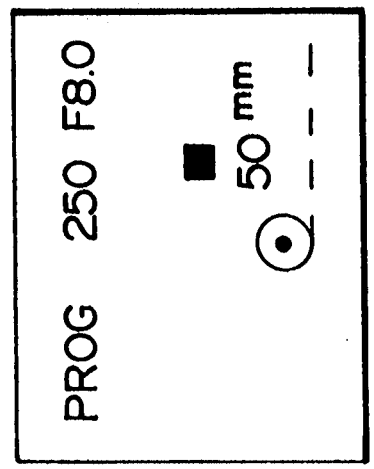

By turning the operating switch 55 on in the status as shown in FIG. 9B, the dot LCD 23 divided into four sections is changed over to one full screen as shown in FIG. 9E on the basis of the full display means 74. On this screen, the detail data or information concerning the selected sub-title data or information is displayed by means of the full display means 74 on the basis of the screen changeover means 100, thereby displaying the screen for setting a "program mode 3".

Figure 9F:
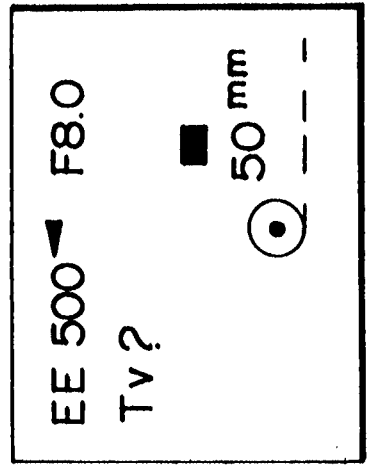

When the operating switch 56 is turned on from the status as shown in FIG. 9B, the divided dot LCD 23 is switched over to one full screen as shown in FIG. 9F on the basis of the full display means 74. This screen displays the detail data or information relating to the selected sub-title data or information by means of the full display means 74 on the basis of the screen changeover means 100, thereby displaying the screen for setting a "shutter priority mode".

On the screen as shown in FIG. 9F, a sign "EE 250 F8.0" is displayed at an upper portion of the screen and a sign "Tv?" is displayed at a portion underneath the upper portion thereof at which the above sign is displayed. The sign "Tv" indicates an abbreviation of the term "TIME VALUE" indicative of a shutter speed.

Figure 9G:
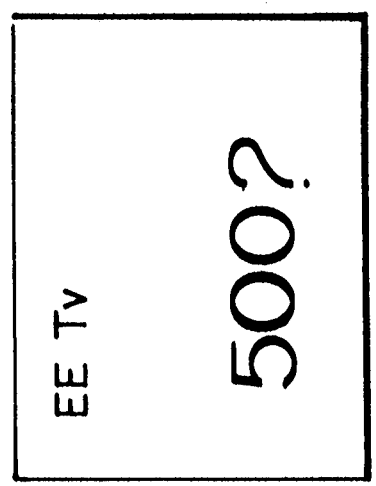
FIGS. 9G and 9H are diagrammatic representations of the displays on the screen of the dot LCD when changed from the status of FIG. 9F by selectively turning the UP switch and the DOWN switch on, respectively, at an appropriate time.
Figure 9H:
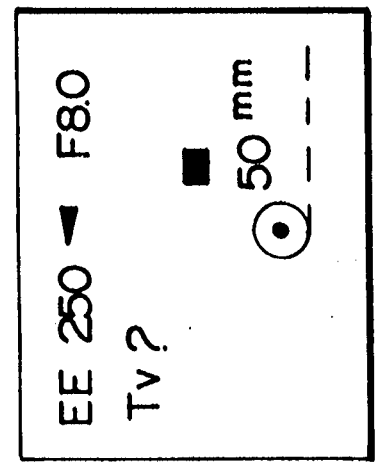

When the UP switch 76 or the DOWN switch 77 is turned on from the status as shown in FIG. 9F, the screen is changed over to the screen as shown in FIG. 9G, where a sign "EE Tv 500?". From this status as shown in FIG. 9G, turning of the UP switch 76 or the DOWN switch 77 on turns to the screen as shown in FIG. 9H displaying a screen showing a sign "EE 500 F8.0 Tv?" and asking whether the setting of the shutter speed to 500 is adequate.

An instance of operating the "exposure setting mode" will be described with reference to FIGS. 10A to 10H, inclusive.

Figure 10A:
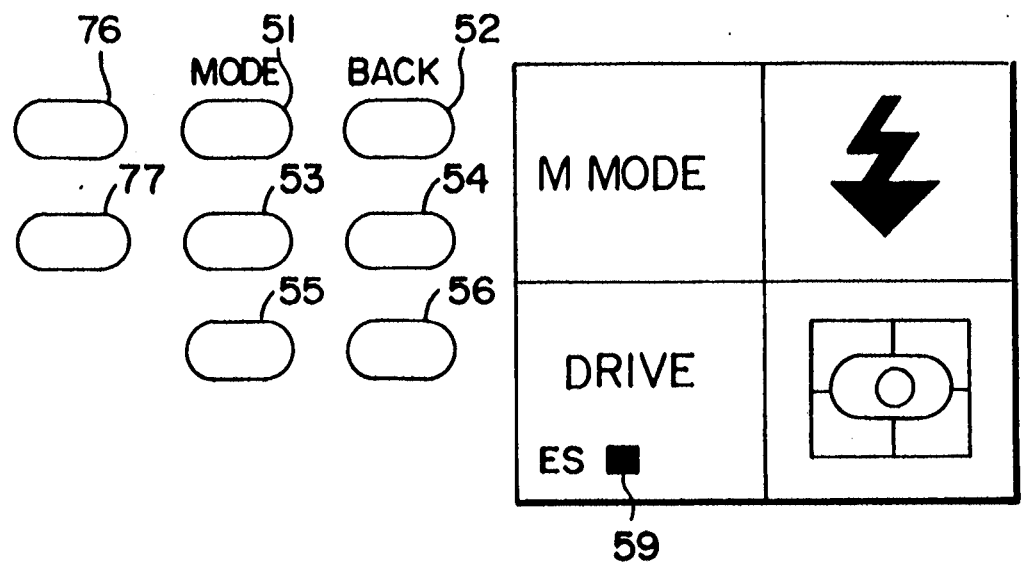
FIG. 10A is a diagrammatic representation of a display of the four-divided regions of the dot LCD prior to operation of an "exposure setting mode", on each of which a title is displayed, and the arrangement of the switches for operating the dot LCD.

FIG. 10A is a display of the screen of the dot LCD 23 prior to operation when the lens is changed over to work manually. The sign "M MODE" indicative of a manual mode is displayed in the first region 23a on the screen, and the symbol 57 for the stroboscope operating mode is displayed in the second region 23b. The screen in the third region 23c displays the sign "DRIVE" in its middle portion as well as the sign "ES" and the symbol indicated by 59 in smaller sizes in its lower left-hand corner portion. When the operating switch 53 is turned on in the status as shown in FIG. 10A, the "M MODE" displayed on the screen in the first region 23a is selected by the sub-title selecting means 73, thereby shifting to the screen for selecting the "exposure mode" as shown in FIG. 10B.

Figure 10B:
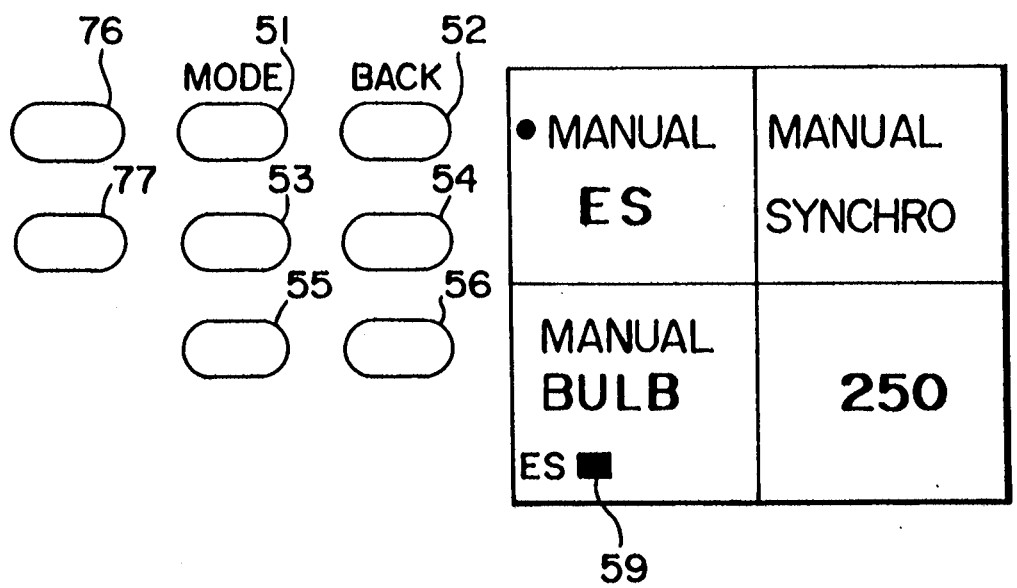
FIG. 10B is a diagrammatic representation of a display of the four-divided regions, on each of which a title is displayed when the display status has been changed from the status of FIG. 10A by turning an operating switch on, and the arrangement for the corresponding operating switches.

On the screen in the status as shown in FIG. 10B, a sign "MANUAL ES" is displayed in two rows in the first region 23a and a sign "MANUAL SYNCHRO" is displayed in two rows in the second region 23b. Likewise, the third region 23c displays a sign "MANUAL BULB" in two rows at the upper and middle portions as well as the sign "ES" and the symbol indicated by 59 are displayed at the lower left-hand corner portion. The screen in the fourth region 23d displays numeral "250". Turning the BACK switch 52 on from this display screen returns the screen to that as shown in FIG. 10A.

Figure 10C:
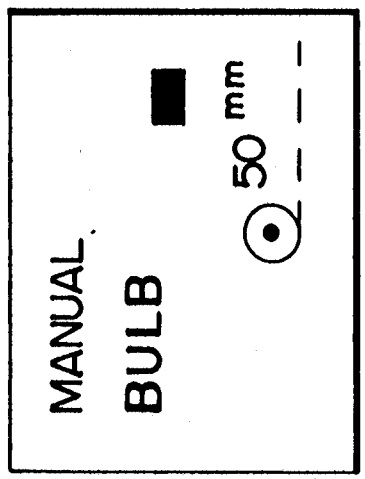
FIGS. 10C to 10F, inclusive, are diagrammatic representations of the displays on the screen of the dot LCD when changed from the status of FIG. 10B by selectively turning the respective operating switches on at an appropriate time.

When the operating switch 53 is turned on in the state as shown in FIG. 10B, the four-divided dot LCD 23 is changed into one full screen as shown in FIG. 10C on the basis of the full display means 74, on which the detail data or information relating to the selected sub-title data or information is displayed as "MANUAL 250", thereby providing a display screen for setting an "lens opening priority mode".

Figure 10D:
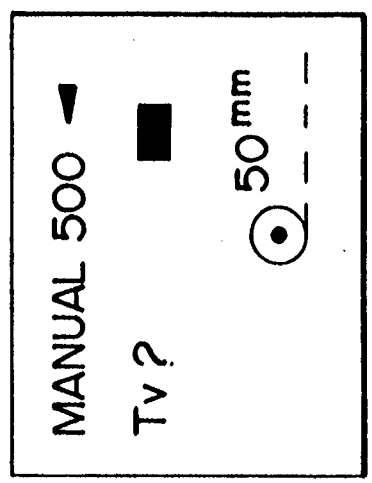

Turning the operating switch 54 on from the state as shown in FIG. 10B provides a full screen of the dot LCD 23 likewise as the operating switch 53 is operated, thereby shifting the display stating "MANUAL 250" to the display represented as "MANUAL 125" as shown in FIG. 10D and providing a display screen for setting a "stroboscopic synchronization speed mode".

Figure 10E:
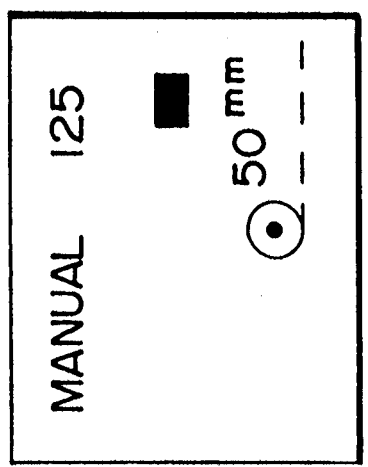

When the operating switch 55 is turned on from the display screen of the dot LCD 23 as shown in FIG. 10B, the display screen is changed to the display screen as shown in FIG. 10E on which a sign "MANUAL BULB" is displayed to thereby give a display screen for setting a "program mode".

Figure 10G:
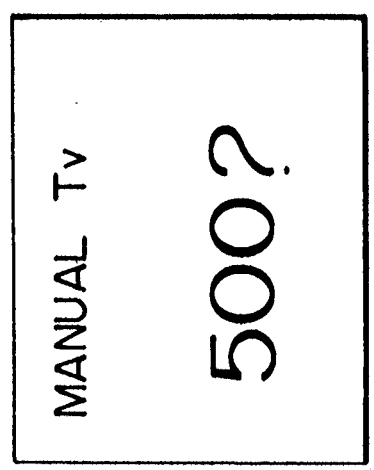
FIGS. 10G and 10H are diagrammatic representations of the displays on the screen of the dot LCD when changed from the status of FIG. 10F by selectively turning the UP switch and the DOWN switch on, respectively, at an appropriate time.
Figure 10F:
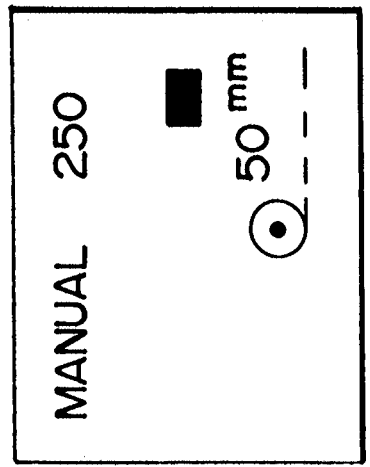
Figure 10H:
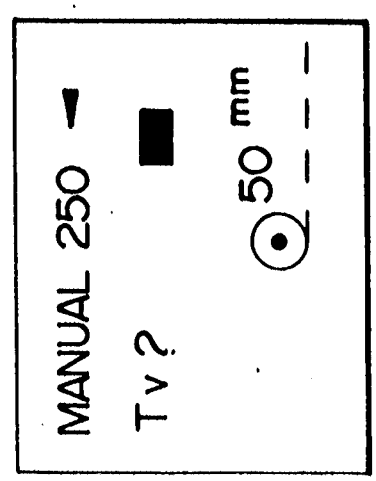

By turning the operating switch 56 on from the status as shown in FIG. 10B, the display screen is shifted to a full screen as shown in FIG. 10F, which displays a sign "MANUAL 250 Tv?" and produces a display screen for setting a "shutter priority mode".

When the UP switch 76 or the DOWN switch 77 is turned on from the "shutter priority mode", the display screen is changed to a display screen as shown in FIG. 10G, which displays a sign "MANUAL Tv 500?". Further, turning the UP switch 76 or the DOWN switch 77 on from the display screen as shown in FIG. 10G changes a display screen so as to display a sign "MANUAL 500◀Tv?" and asks whether the setting of the shutter speed to 500 is adequate.

FIGS. 11A to 11G, inclusive, describe an instance of operating the "stroboscope operating mode".

Figure 11A:
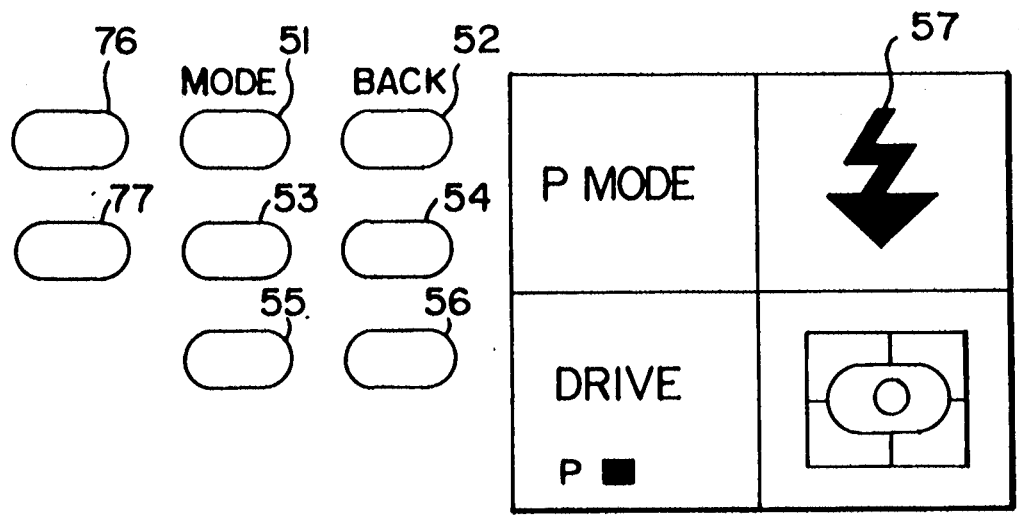
FIG. 11A is a diagrammatic representation of a display of the four-divided regions of the dot LCD prior to operation of an "stroboscope setting mode", on each of which a title is displayed, and the arrangement for the switches for operating the dot LCD.

As the lens has been shifted over to an automatic position, the screen of the dot LCD 23 is changed over to the screen as shown in FIG. 11A, which displays the sign "P MODE" in its first region 23a, the strobe symbol 57 in its second region 23b, the sign "DRIVE" in the third region 23c, and the symbol 58 indicative of the photometric division in the fourth region 23d.

Figure 11B:
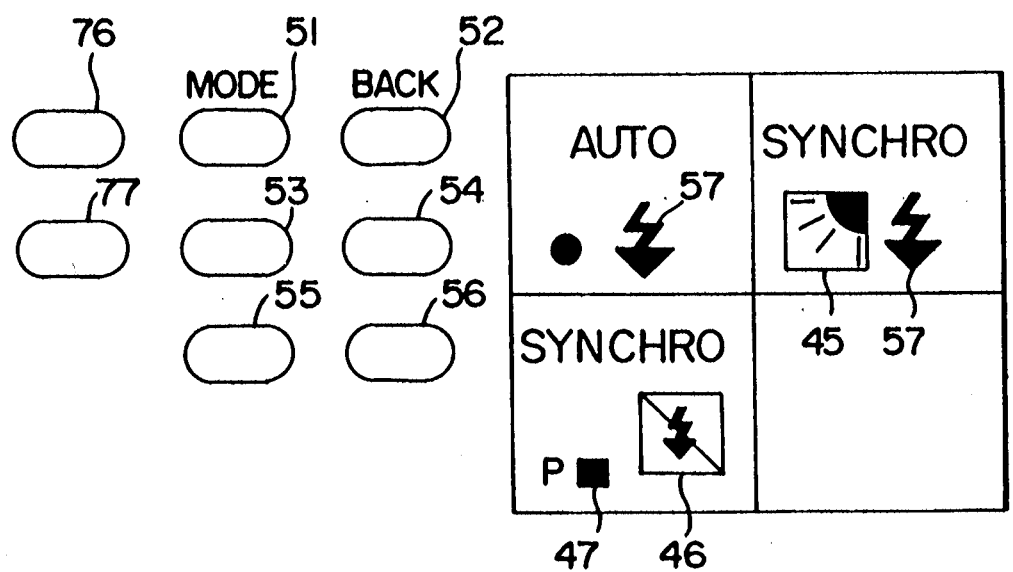
FIG. 11B is a diagrammatic representation of a display of the four-divided regions thereof on each of which a title is displayed when the display status has been changed from the status of FIG. 11A by turning an operating switch on, and the arrangement of the corresponding operating switches.

Turning the operating switch 54 on from the status as shown in FIG. 11A, the sub-title selecting means 73 selects the "STROBE" mode in the second region 23b thereby displaying the subordinate data or information relating to the "strobe mode" as shown in FIG. 11B.

More specifically, a sign "AUTO" and the symbol 57 are displayed on the screen in the first region 23a of the dot LCD 23 and a sign "SYNCHRO" and symbols 45 and 57 are displayed on the screen in the second region 23b thereof while the display in the fourth region of the screen is blank. When the BACK switch 52 is turned on in this status, the display screen is returned back to the screen as shown in FIG. 11A.

Figure 11D:
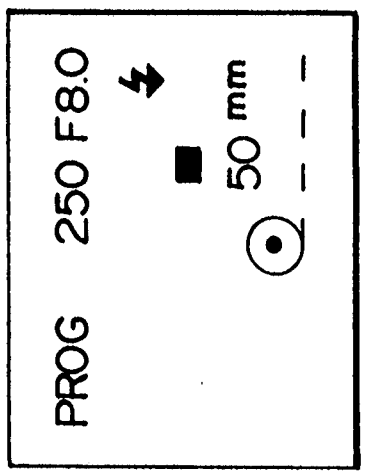
FIGS. 11C to 11G, inclusive, are diagrammatic representations of the displays on the screen of the dot LCD when changed from the status of FIG. 11B by selectively turning the respective switches on at an appropriate time.
Figure 11C:
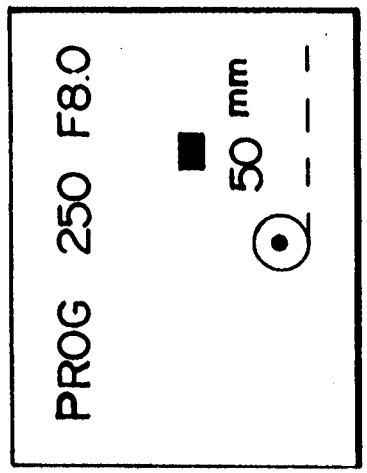

Turning the operating switch 53 on from the status as shown in FIG. 11B shifts the four-divided display screen to one full screen as shown in FIG. 11C, on the basis of the full display means 74. On the screen as shown in FIG. 11C, a sign "PROG 250 F8.0" is displayed by means of the full display means 74 on the basis of the screen changeover means 100, thereby providing a display screen for setting an "automatic strobo-scope lightening mode". It is noted herein that the screen shown in FIG. 11C displays a status prior to completion of charging. As the charging has been completed from this state, the screen is changed over to the screen as shown in FIG. 11D displaying the symbol indicated by 57 in a smaller size on top of the screen display of FIG. 11C.

Figure 11G:
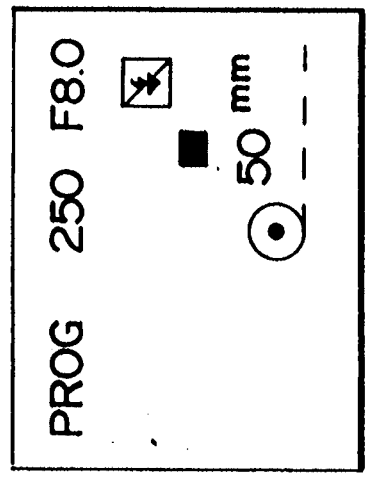
Figure 11F:
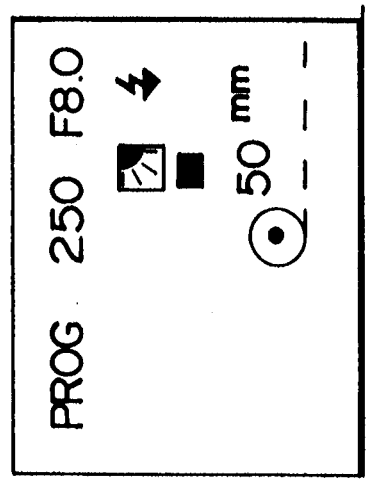
Figure 11E:
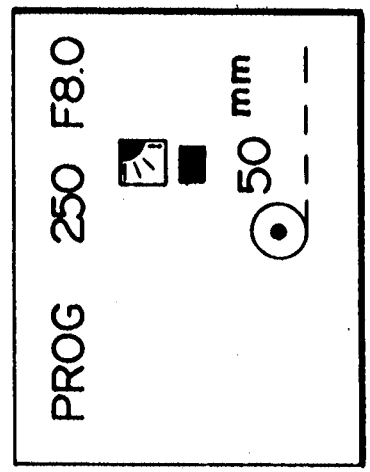

When the operating switch 54 is turned on from the status as shown in FIG. 11B, the full display means 74 changes the screen over to the status as shown in FIG. 11E. This screen displays a sign stating "PROG 250 F8.0" and the symbols indicated by 45 and 47 by means of the full display means on the basis of the screen changeover means 100, and this screen serves as a display screen for setting the "daylight synchronization mode" prior to completion of charging. As the charging has been finished in the above-described screen, the symbol indicated by 57 is displayed in a small size, in addition to the screen display of FIG. 11E, as shown in FIG. 11F.

By turning the operating switch 55 on from the display screen of FIG. 11B, the full display means 74 changes the screen over to the display screen as shown in FIG. 11G, which displays the sign "PROG 250 F8.0" and the symbol indicated by 46 by means of the full display means 74 on the basis of the screen changeover means 100, thereby providing a display screen for setting the "automatic lightening inhibition mode".

An example of operating the "drive mode" will now be described with reference to FIG. 12.

Figure 12A:
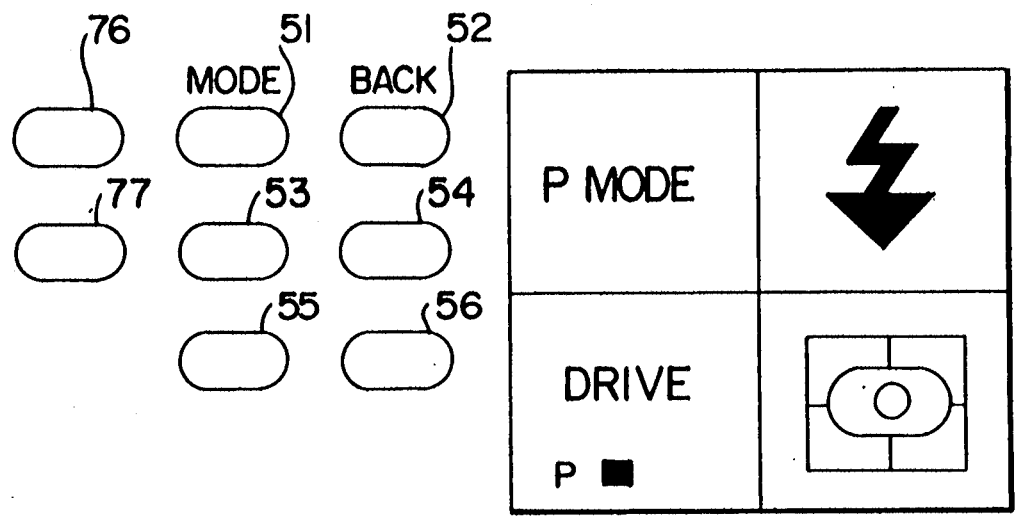
FIG. 12A is a diagrammatic representation of a display of the four-divided regions of the dot LCD prior to operation of a "drive mode", on each of which a title is displayed, and the arrangement for the switches for operating the dot LCD.

When the lens is set automatically, the display screen is changed over to that as shown in FIG. 12A which displays the sign "P MODE" in the first region 23a, the symbol indicated by 57 in the second region 23b, the sign "DRIVE" in the third region 23c, and the photometric symbol indicated by 58 in the fourth region 23d.

Figure 12B:
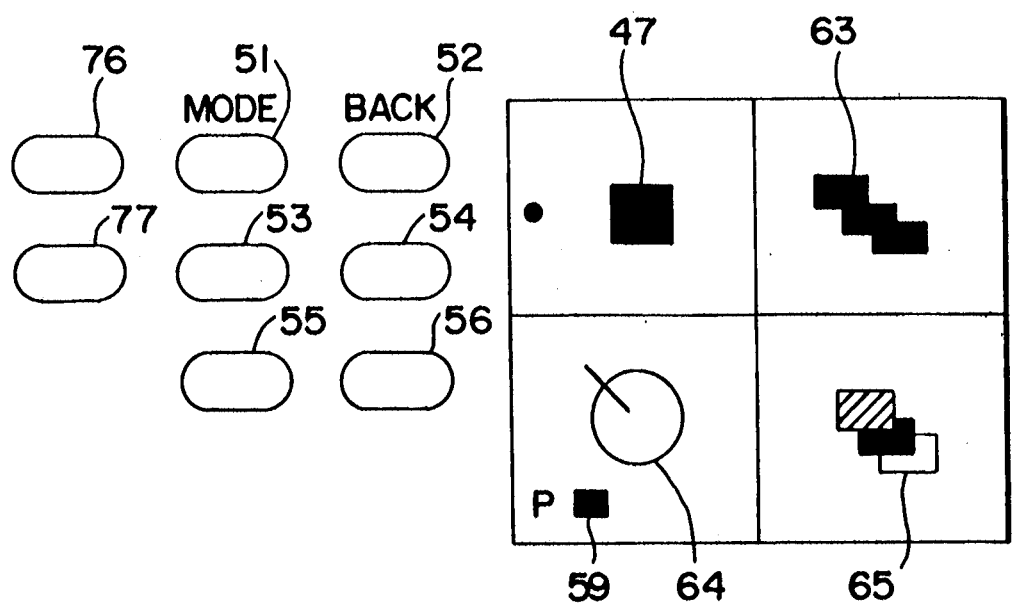
FIG. 12B is a diagrammatic representation of a display of the four-divided regions thereof on each of which a title is displayed when the display status has been changed from the status of FIG. 12A by turning an operating switch on, and the arrangement of the corresponding operating switches.

Turning the operating switch 55 on from this state changes the display screen over to a full screen as shown in FIG. 12B so as to display the detail data or information subordinate to the sub-title data or information "DRIVE" displayed in the third region 23c of the screen in each region by means of the sub-title selecting means 73. More specifically, a symbol indicated by 47 indicative of a "singly photographing mode" is displayed in the first region 23a and a symbol indicated by 63 indicative of a "continuously photographing mode" is displayed in the second region 23b. A sign indicated by 64 indicative of a "self-timer mode" is displayed in the third region 23c and a symbol indicated by 65 indicative of the "MAB mode" is displayed in the fourth region 23d.

Figure 12C:
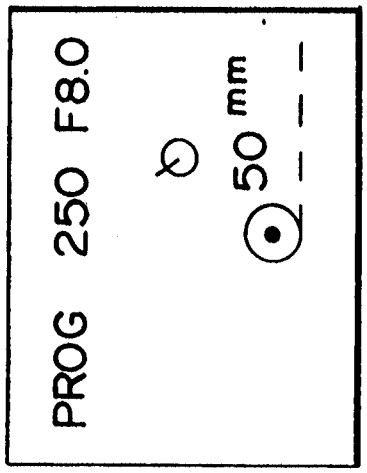

By turning the operating switch 53 on from the status as shown in FIG. 12B, the full display means 74 changes the display screen over to one full screen as shown in FIG. 12C, which displays the sign "PROG 250 F8.0" and the symbol indicated by 47 by means of the full display means 74 on the basis of the screen changeover means 100, thereby serving as a display screen for setting the "single photographing mode".

Figure 12D:
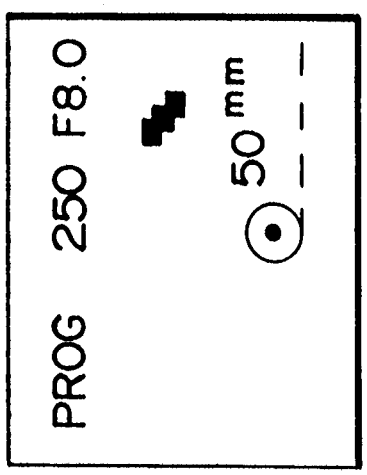
Figure 12G:
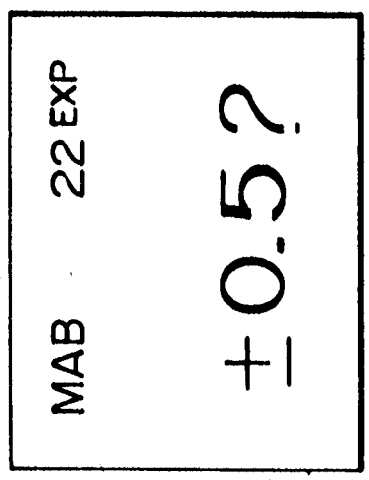
FIG. 12G is a diagrammatic representation of a display on the screen of the dot LCD when changed from the status of FIG. 12F by selectively turning an EF switch and the UP switch or the DOWN switch on at an appropriate time.

When the operating switch 54 is turned on from the status as shown in FIG. 12B, the full display means 74 changes the display screen over to a screen as shown in FIG. 12D which serves as a display screen for setting the "continuously photographing mode". The display on the screen as shown in FIG. 12D is substantially identical to that as shown in FIG. 12C, except for the symbol indicated by 47 on the screen in FIG. 12C has been changed to the symbol indicated by 63.

Figure 12E:
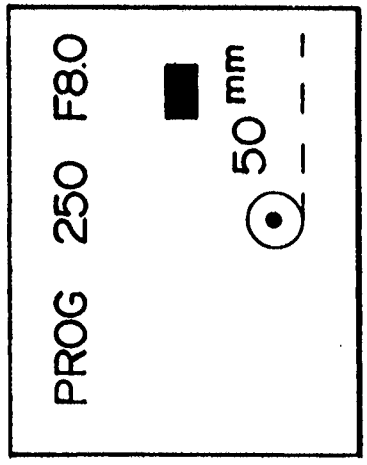

By turning the operating switch 55 on from the status as shown in FIG. 12B, the full display means 74 changes the display screen over to one full screen as shown in FIG. 12E, which serves as a display screen for setting the "self-timer mode". The display on the screen as shown in FIG. 12E is substantially identical to that as shown in FIG. 12D, except that the symbol indicated by 63 on the screen in FIG. 12D has been changed to the symbol indicated by 64.

Figure 12F:
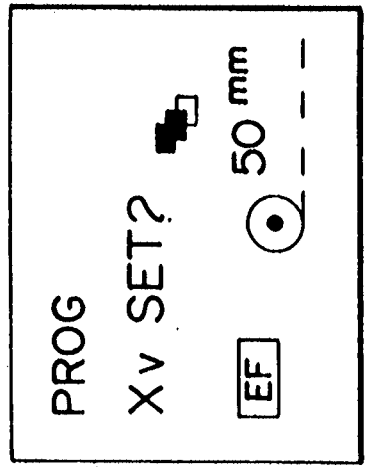

Turning the operating switch 56 on from the status as shown in FIG. 12B changes the four-divided screen over to a full screen as shown in FIG. 12F on the basis of the full display means 74, which displays signs "PROG" "Xv SET?", the symbol indicated by 65 for the "MAB mode" and the sign "EF", thereby functioning as a display screen for setting the "MAB mode".

When a "±EF" switch (not shown) and the UP switch 76 or the DOWN switch 77 are turned on from the status as shown in FIG. 12F, the display screen is changed over to a display screen having signs "MAB" and "22$^{EXP}$" at its upper portion in smaller sizes and a sign "±0.5?" at its middle portion in a larger size, thereby requiring the setting of a width of a variation in exposure in the "MAB mode".

Description will now be made of an example of operating the "photometric mode" in conjunction with FIGS. 13A to 13D, inclusive.

Figure 13A:
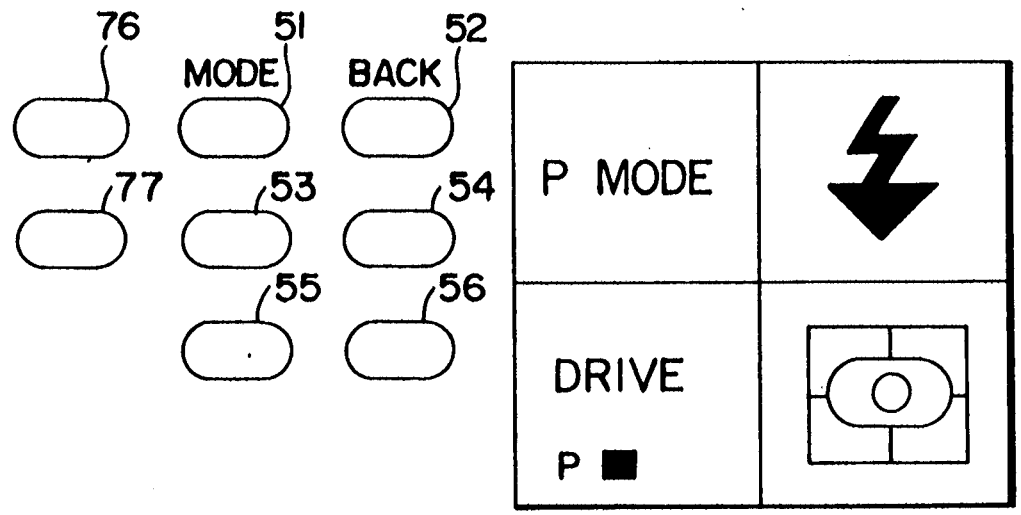
FIG. 13A is a diagrammatic representation of a display of the four-divided regions of the dot LCD prior to operation of a "photometric mode", on each of which a title is displayed, and the arrangement for the switches for operating the dot LCD.
Figure 13B:
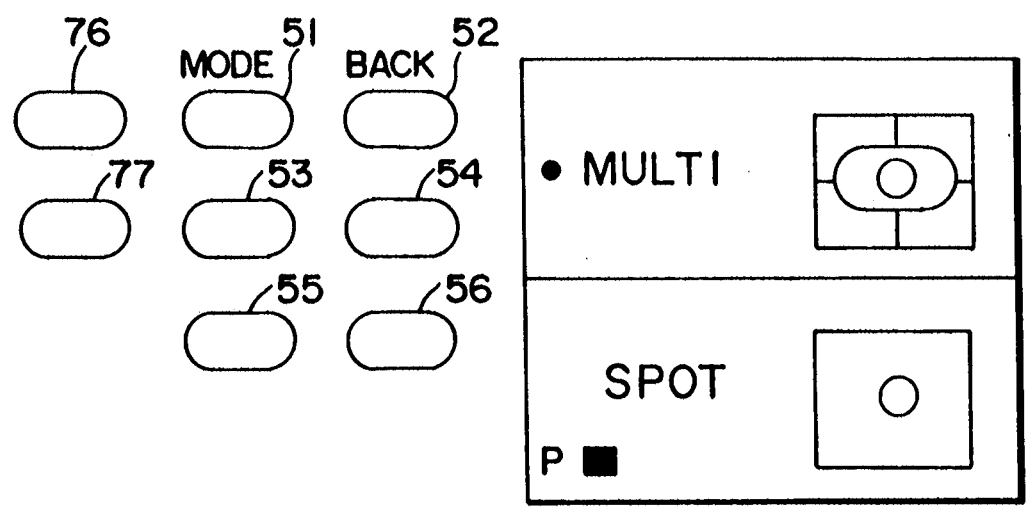
FIG. 13B is a diagrammatic representation of a display of the four-divided regions, on each of which a title is displayed when the display status has been changed from the status of FIG. 13A by turning an operating switch on, and the arrangement of the corresponding operating switches.

When the lens is set automatically, the display screen produces a display prior to operation as shown in FIG. 13A. When the operating switch 56 is turned on from the status as shown in FIG. 13A, the sub-title selecting means 73 selects the "photometric mode" and the display screen is divided into two sections, upper and lower, as shown in FIG. 13B. A sign "MULTI" is displayed on the screen in the upper section, on the one hand, thereby indicating that the upper section is set as a display screen for setting a "divided photometric mode". A sign "SPOT" is displayed on the screen in the lower section, on the other hand, thereby indicating that the lower section is set as a display screen for setting a "spot photometric mode".

When the operating switches 53 and 54 are turned on simultaneously from the status as shown in FIG. 13B, the full display means 74 changes the display screen over to one full screen as shown in FIG. 13C. This screen displays the sign "PROG 250 F8.0" and the symbol indicated by 47 by means of the full display means 74 on the basis of the screen changeover means 100, thereby serving as the display screen for setting the "divided photometric mode".

When the operating switches 55 and 56 are turned on simultaneously from the status as shown in FIG. 13B, the full display means 74 changes the display screen over to one full screen as shown in FIG. 13D, which displays the symbol indicated by 48 indicative of the "spot photometric mode", in a smaller size, in addition to all the displays on the screen as shown in FIG. 13C, thereby serving as the display screen for setting the "spot photometric mode".

An example of operating the "Xv mode" will be described with reference to FIGS. 14A to 14C, inclusive.

In a state that the lens is automatically focused, the display screen of the dot LCD 23 prior to operation has the sign "Xv" displayed in its first region 23a, the sign "ISO" displayed in its second region 23b, the sign "MULTI" displayed in its third region 23c, and the sign "AE LOCK" displayed in its fourth region 23d, as shown in FIG. 14A.

When the operating switch 53 is turned on from the status as shown in FIG. 14A, the sub-title selecting means 73 selects the sign "Xv mode" displayed in the first region 23a, thereby shifting the four-divided screen to one full screen as shown in FIG. 14B, on the basis of the full display means 74. This screen displays the signs "PROG 250 F8.0" in its upper portion, "Xv SET?" at its middle portion, and "EF" (an abbreviation of exposure correction) in its lower left-hand corner portion. Turning the BACK switch 52 on from this status returns a display of the status as shown in FIG. 14A. When an "EF" switch (not shown) is turned on from the status as shown in FIG. 14B, the screen is switched over to a display screen as shown in FIG. 14C which in turn displays a sign "−2.5?" by asking whether an exposure correction value (Xv) of −2.5 is adequate.

Description will be made of operating an "ISO mode" with reference to FIGS. 15A to 15C, inclusive.

When the lens is changed over so as to focus automatically, the dot LCD 23 provides a display prior to operation as shown in FIG. 15A. Turning the operating switch 54 on from this state displays a currently set ISO value with a question mark (?) on the screen. Further, when the UP switch 76 and the DOWN switch 77 are switched over in an appropriate way, the sign "ISO" is displayed at a lower middle portion of the screen as shown in FIG. 15B when the set ISO value is found to differ from the ISO value of the film used. When the set ISO value is identical to the ISO value of the film used, no display of the sign "ISO" is made at the lower middle portion of the screen. By turning the EF switch, (not shown) and the UP switch 76 or the DOWN switch 77 on from this state, the display screen is changed over to a display screen as shown in FIG. 15C and a sign "ISO 200?" is displayed in two rows in larger sizes, thereby asking whether the ISO value of 200 is adequate.

An example of operating the "multiple exposure mode" will be described with reference to FIGS. 16A to 16C, inclusive.

In a state that the lens is automatically focused, the display screen of the dot LCD 23 prior to operation has the sign "Xv" displayed in its first region 23a, the sign "ISO" displayed in its second region 23b, the sign "MULTI" displayed in its third region 23c, and the sign "AE LOCK" displayed in its fourth region 23d, as shown in FIG. 16A.

When the operating switch 55 is turned on from the status as shown in FIG. 16A, the full display means 74 changes the dot LCD 23 over to one full screen as shown in FIG. 16B, which displays a sign "MULTI EXP 5?", thereby requiring the setting of the "number of exposure at the time of the multiple exposure". Turning the BACK switch 52 on from this status, as shown in FIG. 16B returns the display screen to the status as shown in FIG. 16A. By turning a ME switch (not shown) and the UP switch 76 or the DOWN switch 77 on from the status as shown in FIG. 16B, the display screen has the signs "PROG 250 F8.0", "EXP SET 5?" and "MEX" displayed as shown in FIG. 16C.

Description will now be made on an example of operating the "AE lock mode" with reference to FIGS. 17A to 17E, inclusive.

As the lens is changed over to an automatic mode, the display of the dot LCD 23 is switched over to a display screen as shown in FIG. 17A, which displays the sign "Xv" in the first region 23a, the sign "ISO" in the second region 23b, the sign "MULTI EXP" (abbreviation of multiple Exposure) in two rows in the third region 23c, and the sign "AE LOCK" in two rows in the fourth region 23d. When the operating switch 56 is turned on from the status as shown in FIG. 17A, the sub-title selecting means 73 selects the sign "AE lock mode" displayed in the fourth region 23d so as to allow the screen changeover means 100 to change the display of the dot LCD 23 over to a display screen as shown in FIG. 17B, which in turn has a display of the sign "AE . LOCK" in the first region 23a, a display of the sign "[AE]" in the second region 23b, and a display of the sign "AE & AF" in the third region 23c. In this case, no display is contained on the screen in the fourth region 23d.

As the operating switch 53 is turned on from the status as shown in FIG. 17B, the display of the dot LCD 23 is changed over by the full display means 74 to a display on the screen as shown in FIG. 17C, which displays the sign "PROG 250 F8.0" at its upper portion and the sign "AE LOCK" at its middle portion and indicates a display screen for setting the "AE and ANGLE OF VIEW LOCK mode".

When the operating switch 54 is turned on from the status as shown in FIG. 17B, then the full display means 74 changes the display of the dot LCD 23 over to a display on the screen as shown in FIG. 17D, which displays the sign "PROG 250 F8.0" at its upper portion and the sign "AE LOCK" at its middle portion and indicates a display screen for setting the "AE LOCK normal mode".

Further, turning the operating switch 55 on from the status as shown in FIG. 17B changes the display of the dot LCD 23 over to a display on its screen as shown in FIG. 17E on the basis of the full display means 74, which displays the sign "AE and AF LOCK" in a middle portion of the screen, in addition to the sign "PROG 250 F8.0" in an upper portion thereof. This display indicates a display screen for setting the "AE and AF LOCK mode". This locks the AF mode as well as the AE mode.

Description will be made of an example of operating the "AF (Auto Focus) mode" in conjunction with FIGS. 18A to 18H, inclusive.

Figure 18A:
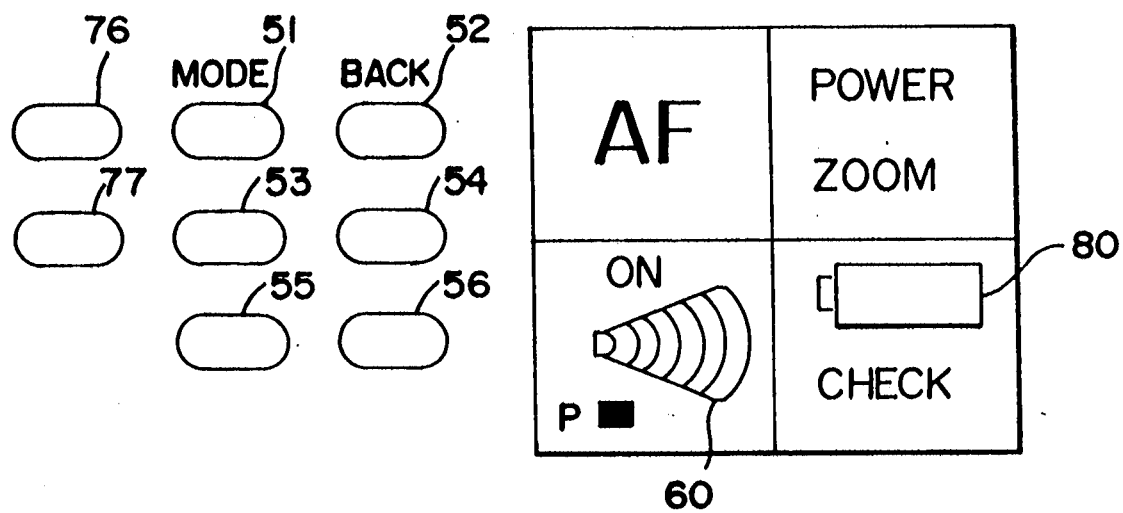
FIG. 18A is a diagrammatic representation of a display of the four-divided regions of the dot LCD prior to operation of an "AF mode", on each of which a title is displayed, and the arrangement for the switches for operating the dot LCD.

As the lens is changed over to an automatic mode, the display of the dot LCD 23 is switched over to a display screen as shown in FIG. 18A, which displays the sign "AF" in the first region 23a, the sign "POWER ZOOM" in two rows in the second region 23b, the sign "ON" and a symbol 1 indicated by 60 for a buzzer mode in the third region 23c, and the sign "CHECK" and the battery symbol 80 in the fourth region 23d.

Figure 18B:
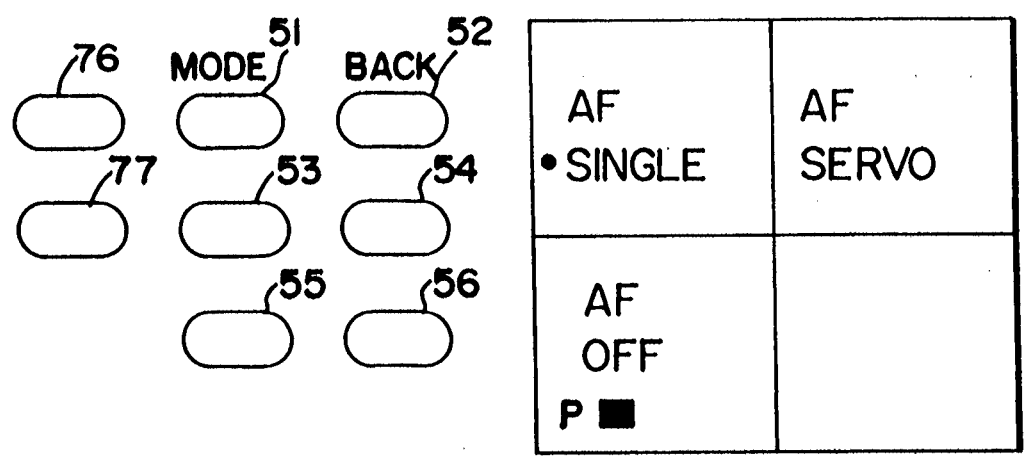
FIG. 18B is a diagrammatic representation of a display of the four-divided regions thereof on each of which a title is displayed when the display status has been changed from the status of FIG. 18A by turning an operating switch on, and the arrangement of the operating switches corresponding thereto.

When the operating switch 53 is turned on from the status as shown in FIG. 18A, the sub-title selecting means 73 selects the sign "AF (Auto Focus) mode" displayed in the first region 23a so as to allow the screen changeover means 100 to change the display of the dot LCD 23 over to a display screen as shown in FIG. 18B, which in turn has a display of the sign "AE . SINGLE" in two rows in the first region 23a, a display of the sign "AF SERVO" in two rows in the second region 23b, and a display of the sign "AF OFF" in two rows in the third region 23c. In this case, no display is contained in the screen in the fourth region 23d.

Figure 18C:

When the operating switch 53 is turned on from the status as shown in FIG. 18B, the full display means 74 changes the screen of the four-divided dot LCD 23 over to one full screen as shown in FIG. 18C. The screen has a display of a sign "AF SINGLE SET" in three rows. After a given time period has elapsed in this display status, the display on the screen changes over to a display as shown in FIG. 18D, which displays the sign "PROG 250 F8.0" indicating a display screen for setting the "AF SINGLE mode".

Figure 18E:
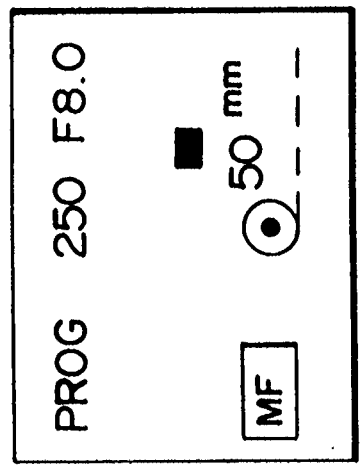
Figure 18D:
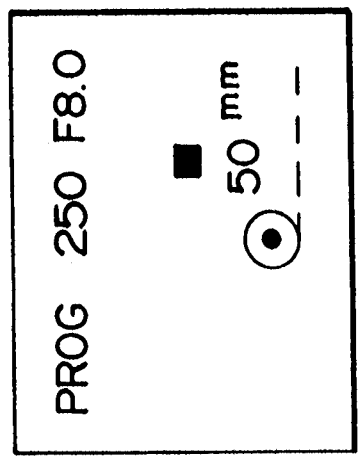
FIG. 18D is a diagrammatic representation of the display on the screen of the dot LCD when changed in a constant period of time after the status of FIG. 18C.

As the operating switch 54 is turned on from the status as shown in FIG. 18B, the full display means 74 changes the screen of the four-divided dot LCD 23 over to one full screen as shown in FIG. 18E. The screen has a display of a sign "AF SERVO SET" in three rows. After a given time period has elapsed in this display status, the display on the screen changes over to a display as shown in FIG. 18F, which displays a sign "AF SERVO SET" indicating a display screen for setting the "AF SERVO mode".

Figure 18G:
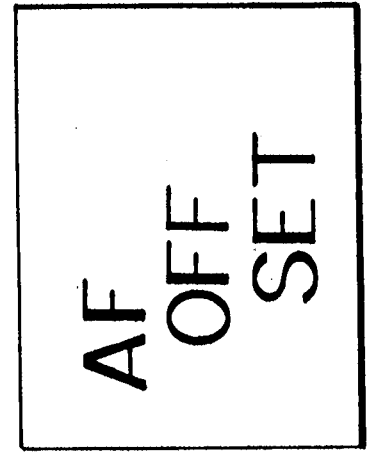
Figure 18F:
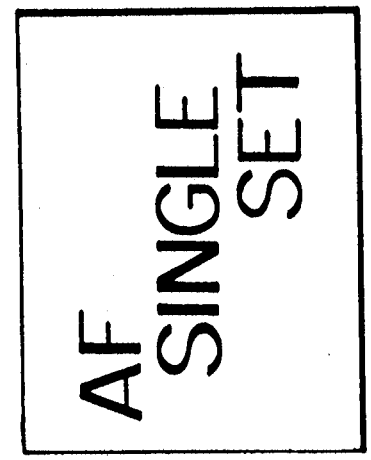
FIG. 18F is a diagrammatic representation of the display on the screen of the dot LCD when changed in a constant period of time after the status of FIG. 18E.
Figure 18H:
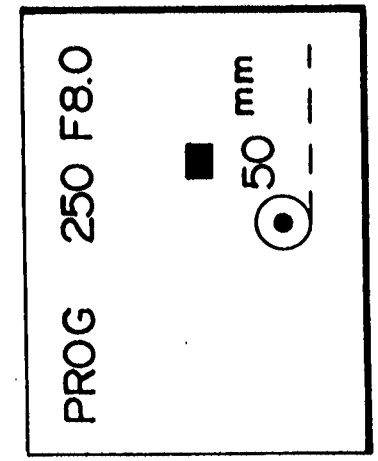
FIG. 18H is a diagrammatic representation of the display on the screen of the dot LCD when changed in a constant period of time after the status of FIG. 18G.

When the operating switch 55 is turned on from the status as shown in FIG. 18B, a sign "AF OFF" in the third region 23c of the four-divided dot LCD 23 is selected, and the full display means 74 changes the display over to one full screen as shown in FIG. 18G. The screen has a display of a sign "AF OFF SET" in three rows. As a given time period has elapsed from this status, the display on the screen changes over to a display as shown in FIG. 18H, which displays the sign "PROG 250 F8.0" at an upper portion of the screen and the sign "MF" in the lower left-hand portion thereof indicating a display screen for setting the "MANUAL FOCUS mode".

An example of operating the "POWER ZOOM mode" will be described with reference to FIGS. 19A and 19E.

Figure 19A:
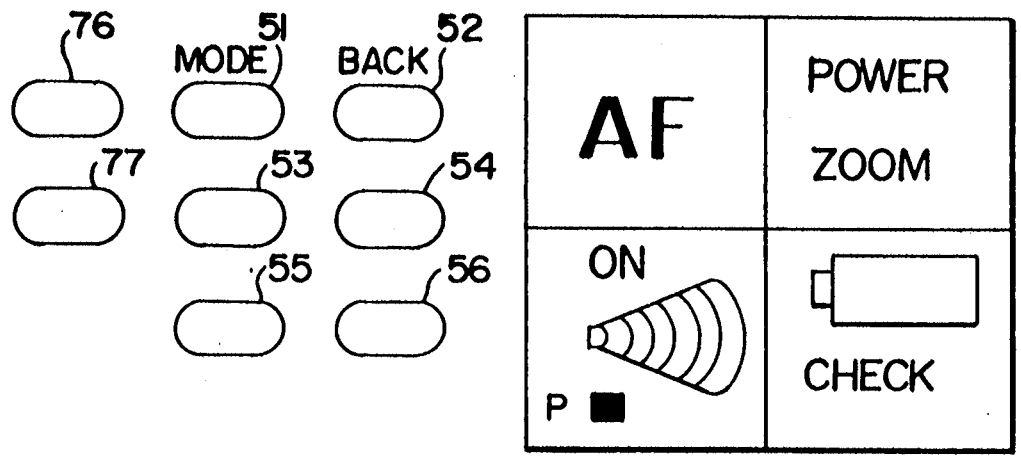
FIG. 19A is a diagrammatic representation of a display of the four-divided regions of the dot LCD prior to operation of a "power zoom mode", on each of which a title is displayed, and the arrangement for the switches for operating the dot LCD.

As the lens is changed over to an automatic mode, the display of the dot LCD 23 is switched over to a display screen as shown in FIG. 19A, which displays the sign "AF" in the first region 23a, the sign "POWER ZOOM" in two rows in the second region 23b, the sign "ON" and the buzzer mode symbol 60 in the third region 23c, and the sign "CHECK" and the battery symbol 80 in the fourth region 23d.

Figure 19B:
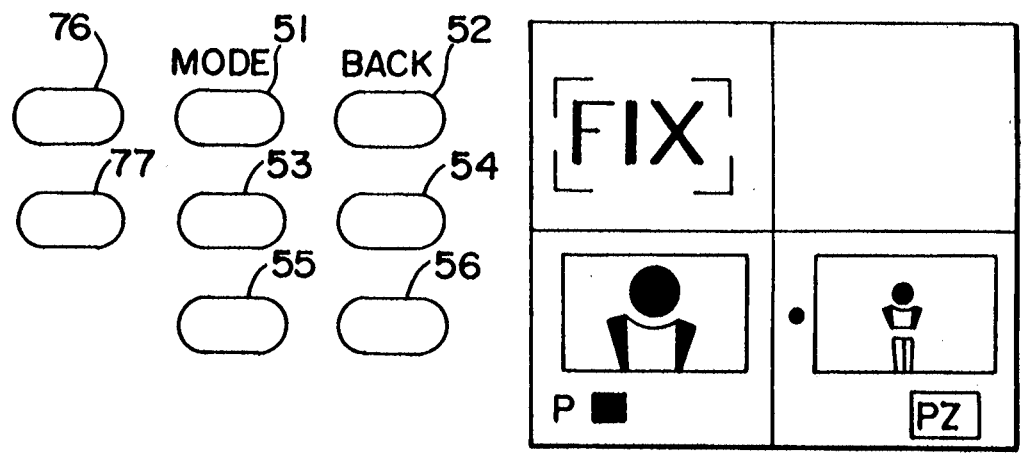
FIG. 19B is a diagrammatic representation of a display of the four-divided regions thereof on each of which a title is displayed when the display status has been changed from the status of FIG. 19A by turning an operating switch on, and the arrangement of the operating switches corresponding thereto.

When the operating switch 54 is turned on from the status as shown in FIG. 19A, the sub-title selecting means 73 selects the sign "POWER ZOOM" displayed in the second region 23b, thereby displaying the subordinate data or information of the selected sub-title data or information on each of the four-divided screen of the dot LCD 23, as shown in FIG. 19B.

More specifically, the display screen as shown in FIG. 19B is changed over to a four-divided screen which in turn has a display of a sign "FIX" (Finder Image Fixing mode) in the first region 23a, a display of a symbol indicated by 66 for a "power zoom mode 2" (FIG. 19D) in the third region 23c, and a display of a symbol indicated by 67 for a "power zoom mode 3" (FIG. 19E) in the fourth region 23d. In this case, no display is contained in screen in the second region 23b.

Figure 19E:
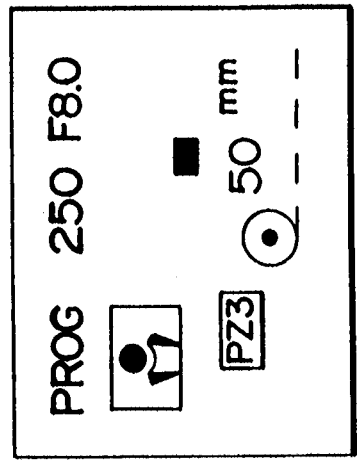
FIGS. 19C through 19E, inclusive, are diagrammatic representations of the displays on the screen of the dot LCD when changed from the status of FIG. 19B by selectively turning the respective switches on at an appropriate time.
Figure 19D:
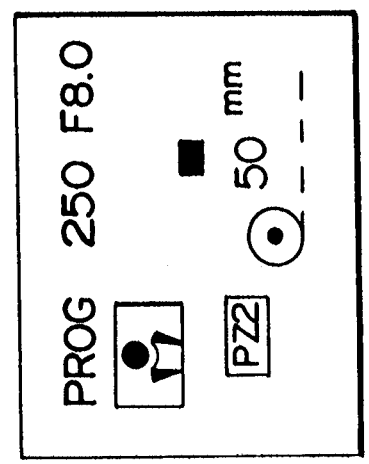
Figure 19C:
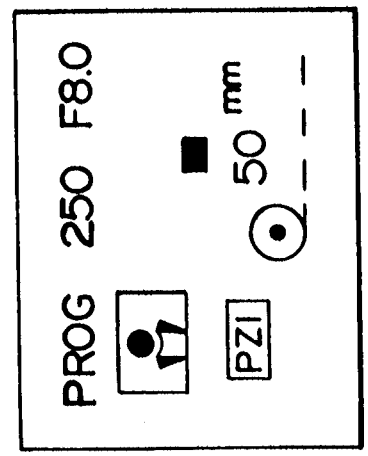

As the operating switch 53 is turned on from the status as shown in FIG. 19B, the first region 23a corresponding to this operating switch is selected by the sub-title selecting means 73, and the full display means 74 changes the four-divided screen of the dot LCD 23 over to one full screen as shown in FIG. 19C, which displays the sign "PROG 250 F8.0" at an upper portion of the screen, the symbol 66 for the power zoom mode at a left-hand middle portion thereof, and a sign "PZ1" (Power Zoom 1) at a lower portion thereof. This display indicates a display screen for selecting a "finder image fixing mode".

When the operating switch 55 is turned on from the status as shown in FIG. 19B, the third region 23c corresponding to this operating switch is selected on the basis of the sub-title selecting means 73, and the full display means 74 changes the four-divided screen of the dot LCD 23 over to one full screen as shown in FIG. 19D, which has substantially the same displays as those as shown in FIG. 19C, except for the display a sign "PZ2" at a lower portion of the screen, which indicates a display screen for selecting a "finder image selection 1 mode".

By turning the operating switch 56 on in the screen as shown in FIG. 19B, a fourth region 23d is selected by the sub-title selecting means 73 to show a display on the screen as shown in FIG. 19E, providing substantially the same display as that as shown in FIG. 19C, except for a sign "PZ3" (Power Zoom 3), and a display screen for setting a "finder image selection 2 mode".

Description will now be made of an example of operating a "buzzer ON/OFF operating mode" in conjunction with FIGS. 20A to 20C, inclusive.

As the lens is changed over to an automatic mode, the display of the dot LCD 23 is switched over to a display screen as shown in FIG. 20A, which displays the sign "AF" in the first region 23a, the sign "POWER ZOOM" in two rows in the second region 23b, the sign "ON" and the buzzer mode symbol 60 in the third region 23c, and the sign "CHECK" and the battery symbol 80 in the fourth region 23d.

When the operating switch 55 is turned on in the status as shown in FIG. 20A, the sub-title data or information displayed in the third region 23c is selected by the sub-title selecting means 73, and the screen changeover means 100 changes the display of the four-divided screen of the dot LCD 23 over to a two-divided screen as shown in FIG. 20B, which displays the buzzer symbol 60 for a "buzzer operating mode" and a sign "BUZZER ON" in an upper section of the display on the screen, on the one hand, and the buzzer symbol 60 for the "buzzer operating mode" and a sign "BUZZER OFF" in a lower section of the display on the screen.

As the operating switches 53 and 54 or the operating switches 55 and 56 are turned on from the status as shown in FIG. 20B, the full display means 74 changes the display on the four-divided screen over to one full screen as shown in FIG. 20C, thereby displaying the sign "PROG 250 F8.0" and setting whether to generate a sound of the buzzer or not.

An example of operating the "battery voltage checking operation mode" will be described with reference to FIGS. 21A to 21D, inclusive.

Figure 21A:
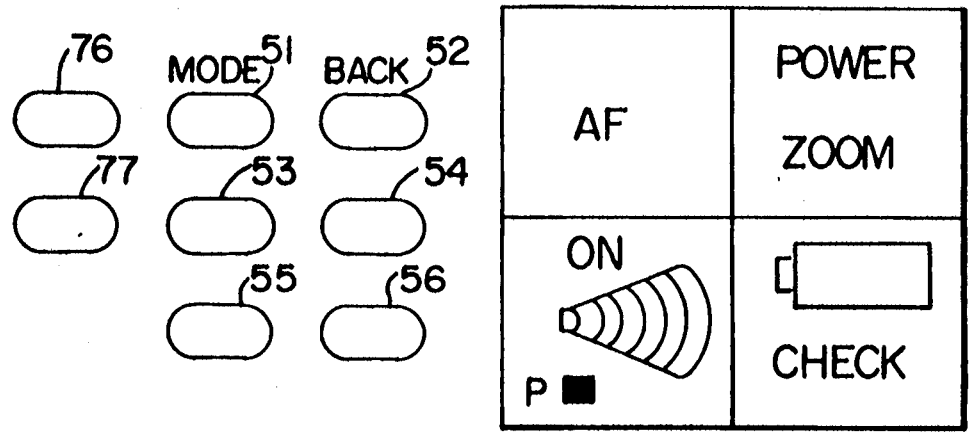
FIG. 21A is a diagrammatic representation of a display of the four-divided regions of the dot LCD prior to operation of a "battery voltage checking mode", on each of which a title is displayed, and the arrangement of the switches for operating the dot LCD.

The display prior to operation as shown in FIG. 21A is made on the four-divided screen of the dot LCD 23, which displays the sign "AF" in the first region 23a, the sign "POWER ZOOM" in two rows in the second region 23b, the sign "ON" and the buzzer symbol 60 for operating the buzzer in the third region 23c, and the sign "CHECK" and the battery mark 80 in the fourth region 23d.

Figure 21B:
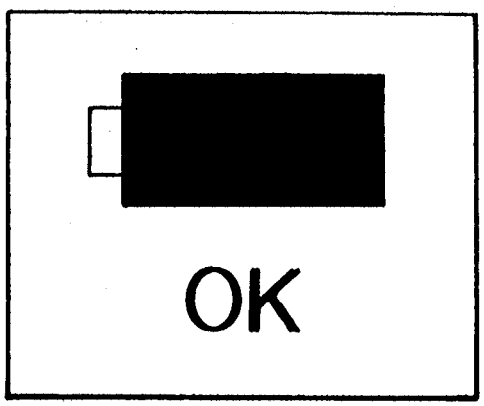
FIG. 21B is a diagrammatic representation of a "battery" mark on the screen of the dot LCD when changed from the status of FIG. 21A by selectively turning the corresponding switch on at an appropriate time, with a mark indicating that the battery's voltage is to a sufficient level.

By turning the operating switch 56 on from the status as shown in FIG. 21A, the full display means 74 changes the display on the four-divided screen of the dot LCD 23 over to one full screen and the screen changeover means 100 changes the display of FIG. 21A over to a display of the battery mark 80 with the battery mark fully colored dark, as shown in FIG. 21B, when the voltage level of the battery is full. And a sign "OK" is displayed at a lower portion of the screen underneath the battery mark.

Figure 21C:
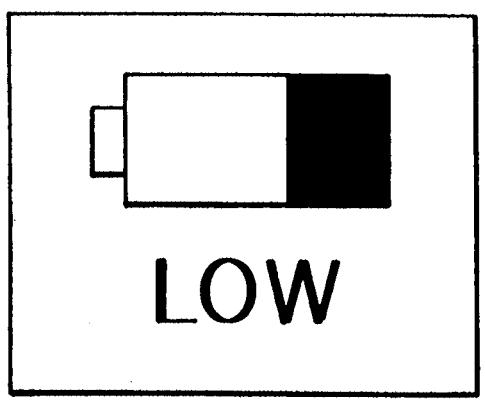
FIG. 21C is a diagrammatic representation of a "battery" mark on the screen of the dot LCD when changed from the status of FIG. 21A by selectively turning the corresponding switch on at an appropriate with a mark indicating that the battery's voltage is reduced to half level.

Likewise, when the voltage level of the battery is low, the display is changed over by the screen changeover means 100 and the battery mark 80 is displayed on the screen as shown in FIG. 21C in such a state that the mark is colored half dark and a sign "LOW" is displayed.

Figure 21D:
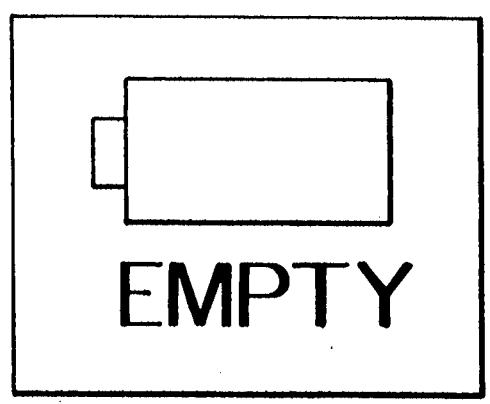
FIG. 21D is a diagrammatic representation of a "battery" mark on the screen of the dot LCD when changed from the status of FIG. 21A by selectively turning the corresponding switch on at an appropriate with a mark indicating that the battery's voltage is reduced to the empty level.

Further, when the voltage level is too low to guarantee a normal exposure control operation, the screen changeover means 100 changes the screen over to the screen as shown in FIG. 21D, which displays the battery mark 80 with a blank outline and a sign "EMPTY" at a lower portion of the screen underneath the battery mark.

The foregoing description is directed to the manner in which the screen of the dot LCD 23 is displayed. Description will now be made of the operation of the display control on the screen of the dot LCD 23 at the time of each operation of the camera, in conjunction with flowcharts of FIGS. 22 to 29.

Figure 22:
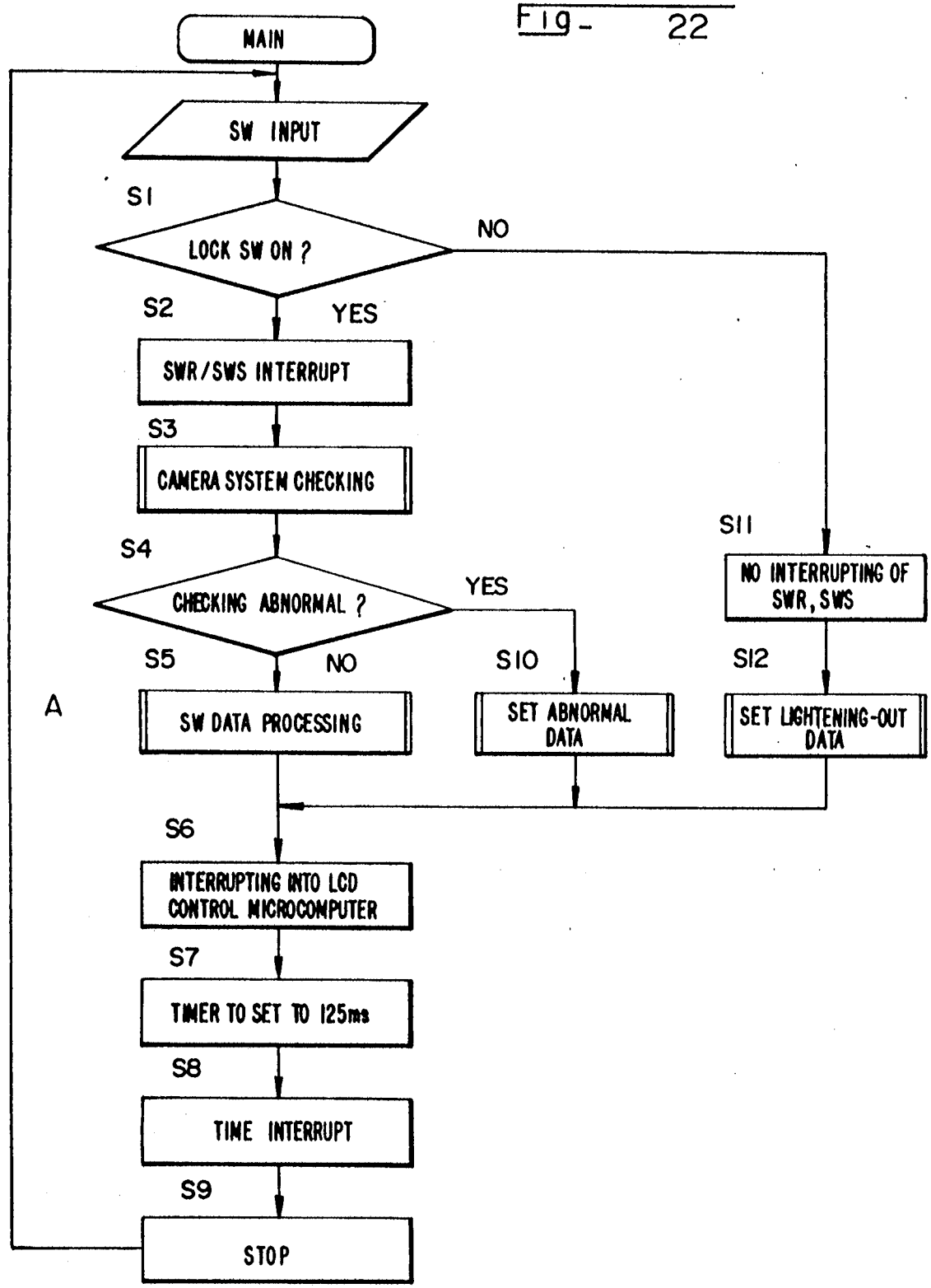
FIG. 22 is a flow chart showing a main routine concerning the operation of this embodiment.

A main flow will first be described with reference to FIG. 22.

As a main switch (not shown) is turned on, a decision is made at step S1 to determine whether the lock switch 28 is in an ON state. If the result of decision at step S1 indicates that the lock switch 28 is in ON state, then the program flow proceeds to step S2. If the result of decision at step S1 indicates that the lock switch 28 is not in ON state, the program flow advances to step S11.

Then at step S2, the setting is made so as to allow the release switch 30 and the photometric switch 29 to interrupt followed by step S3 at which a subroutine for checking a camera system is executed.

At step S4, a decision is made to determine if the camera system is abnormal on the basis of the execution of the camera system checking subroutine. When the result of decision at step S4 indicates that no abnormality is found in the execution of the camera system checking subroutine, the program flow goes to step S5. If the result of decision at step S4 indicates that the camera system is abnormal, then the program flow proceeds to step S10.

Then at step S5, a subroutine for switch data processing is executed to thereby display the data or information on the screen of the dot LCD 23. After the switch data processing is executed at step S5, the program flow proceeds to step S6 followed by steps S7, S8 and S9. In other words, interrupt processing into the LCD control microcomputer 39 is executed at step S6, the timer is set to 125 mS at step S7, and an A loop is started up once at each 125 mS at step S8, followed by step S9 at which the program stops so as to allow a signal from the timer to be interruptible.

At step S10, an abnormal data subroutine is executed in order to display data on abnormal data on the screen of the dot LCD 23 and the program flow advances to step S6.

When the result of decision at step S1 indicates that the lock switch 28 is in an OFF state as described hereinabove, the program flow goes to step S11 at which signals neither from the photometric switch 29 nor from the release switch 30 can be interrupted, followed by step S12 at which a subroutine for a lightening-out data set for putting out the lights forming the display of the dot LCD 23. Thereafter, the program flow goes to step S6.

Figure 23:
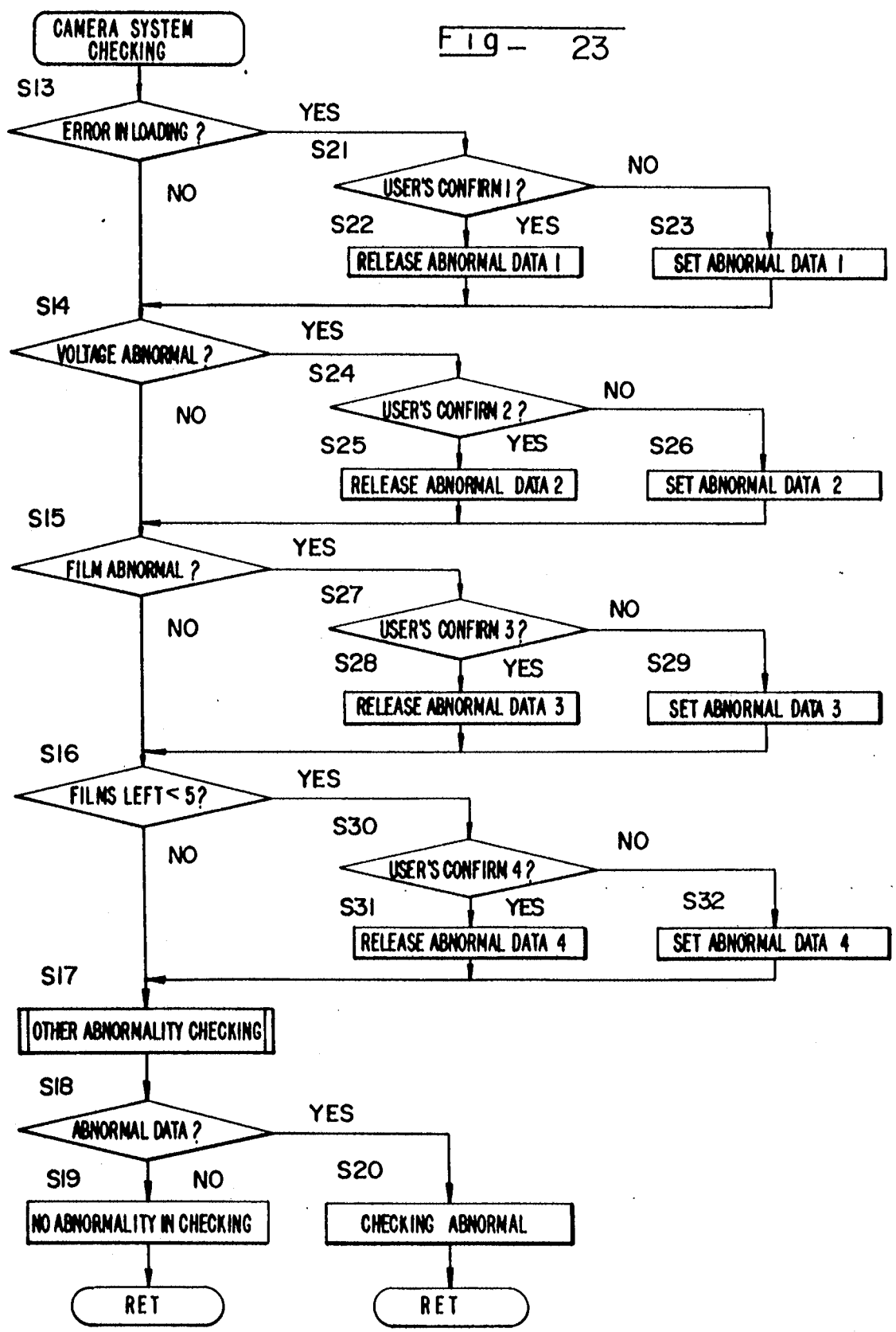
FIG. 23 is a flow chart showing the operation of "camera system checking".

Now, a description will be made of the camera system checking subroutine at step S3 with reference to the flowchart of FIG. 23.

First, at step S13, a decision is made to determine if there is an error on the side of the CPU 24 in loading a film. Then the program flow goes to step S14 when the result of decision at step S13 indicates that no error is found on the side of the CPU 24 in loading the film. The program flow advances to step S24 if the result of decision at step S13 indicates that the loading of the film is in error on the side of the CPU 24.

Subsequent to step S13, a decision is made at step S14 for the purpose of determining if there is an error with respect to a voltage level of the battery. If the result of decision at step S14 indicates that no error is found in the voltage level of the battery, then the program flow proceeds to step S15. If the result of decision at step S14 indicates that there is an error in the voltage level of the battery, the program flow proceeds to step S24.

When no error has been found in the voltage level of the battery as a result of the decision at step S13, then the program flow proceeds to step S15, as described hereinabove, at which a decision in turn is made to determine if there is abnormality in the film used, such as the use of a too old film. Then, the program flow proceeds to step S16 when the result of decision at step S15 indicates that there is no abnormality in the film used, while the program flow proceeds to step S27 if an abnormality is found in the film used.

Then, subsequent to step S15, a decision is made at step S16 to determine if less than five frames of film are left unphotographed in the loaded film. If the result of decision at step S16 indicates that the film has five or more frames left yet unphotographed, then the program flow goes to step S17. If the result of decision at step S16 indicates that less than five frames are left yet unphotographed in the film loaded, then the program flow goes to step S30.

Subsequent to step S16, it is checked at step S17 whether or not there is another abnormality in the functions of the camera, and so on. When the result of decision at step S17 indicates that there is no abnormality in the functions of the camera and so on, the program flows proceeds to step S18 at which a decision is made to determine if there is another abnormality, followed by step S19 when the result of decision at step S18 indicates no abnormality detected, on the one hand, or followed by step S20 when the result of decision at step S18 indicates that there is another abnormality detected. In each case, subsequent to steps S19 and S20, the program flow is returned.

As described hereinabove, when the program flow proceeds to step S21 as a result of the decision at step S13 indicating an error in loading the film, checking of a "user's confirmation 1" is executed. If the screen provides an "error" display, i.e., a display indicating the error and the user turns on a confirmation switch, other than that displayed on the screen, or a given time period elapsed after the display without a confirmation, the program flow proceeds to step S22 at which the "abnormal data 1" is cancelled, followed by step S14. When the user turns on the right confirmation switch in accordance with the "user's confirmation 1", the program flow proceeds to step S23 at which an "abnormal data 1" is set and thereafter the program flow proceeds to step S14.

When the result of decision at step S14 indicating that there is abnormality in the voltage level of the battery, as described hereinabove, the program flow goes to step S24 at which a "user's confirmation 2" is checked. As a result, there is a display on the screen of the dot LCD 23, indicating an error caused by the user pressing a different confirmation switch, or a given time period elapses after the display without a confirmation, the program flow proceeds to step S25 at which an "abnormal data 2" is released followed by proceeding to step S15. If the "user's confirmation 2" at step S24 is correct, the program flow proceeds to step 26 at which an "abnormal data 2" is set, thereby indicating such an abnormal display on the screen and thereafter going to step S15.

When the program flow has proceeded to step S27 subsequent to step S15, a "user's confirmation 3" is checked. If there is an "error" display on the dot LCD 23 and the wrong confirmation switch is pressed by the user after the error confirmation display, or a given period of time passes after the display was given, the program flow goes to step S28 at which an "abnormal data 3" is released followed by proceeding to step S16. As long as the "user's confirmation 3" is not displayed on the dot LCD 23, the program flow proceeds to step S29 at which the "abnormal data 3" is set and then to step S16.

When the program flow has proceeded to step S30 subsequent to step S16, a "user's confirmation 4" is checked. If there is an "error" display on the screen of the dot LCD 23 and the confirmation switch is pressed after confirmation by the user or a given period of time has passed after the display was given, the program flow goes to step S31 at which an "abnormal data 4" is released followed by proceeding to step S17. As long as the "user's confirmation 4" is not executed at step S30, the program flow proceeds to step S32 at which the "abnormal data 4" is set, thereby displaying such an abnormal state on the screen of the dot LCD 23 and then proceeding to step S17.

Figure 24:
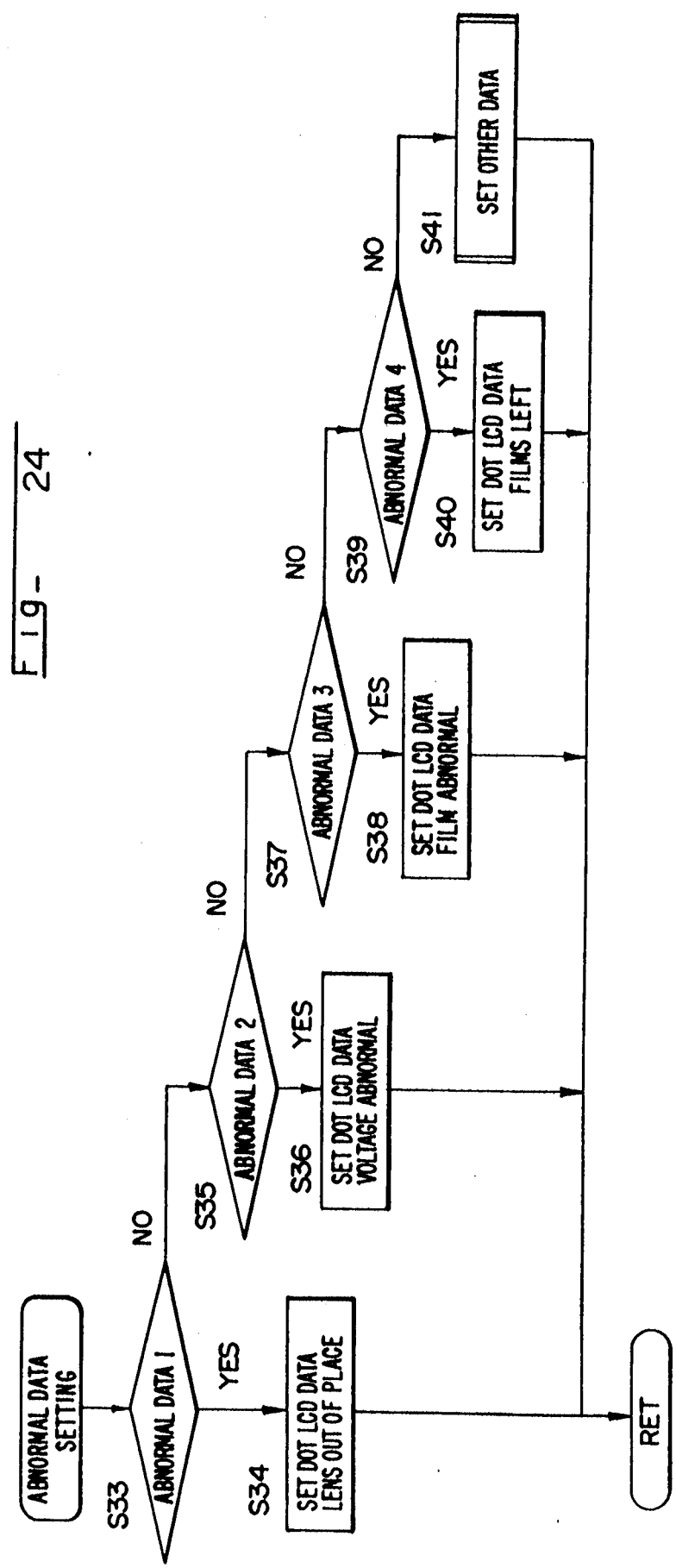
FIG. 24 is a flow chart showing the operation of "abnormal data setting".

Turning now to FIG. 24, description will be made of the "abnormal data set" subroutine as shown at step S10.

When the result of decision at step S4 indicates that there is abnormality in the camera system and the abnormal data is executed, a decision is made at step S33 to determine if the "abnormal data 1" be applied.

As a result, when the decision is made at step S33 to apply the "abnormal data 1", the program flow goes to step S34. On the other hand, when the decision at step S33 is made to the effect that no "abnormal data 1" is to be applied, the program flow proceeds to step S34 at which "dot LCD data" is set and the screen displays a warning indicating that the lens is out of order.

At step S35 subsequent to step S33, a decision is made to determine if the "abnormal data 2" be to be applied. When the result of the decision at step S35 indicates that the "abnormal data 2" is to be applied, the program flow goes to step S37. When the result of decision at step S35 indicates no application of the "abnormal data 2", the program flow goes to step S37. At step S36, the "dot LCD data" is set, providing a display indicating abnormality in the voltage of the battery.

When it is determined at step S35 that no "abnormal data 2" is to be applied, the program flow goes to step S37 at which a decision is further made to determine if the "abnormal data 3" is to be applied, followed by proceeding to step S38 when the result of the decision at step S37 indicates application of the "abnormal data 3", and followed by proceeding to step S39 when the result of decision at step S37 indicates no application of the "abnormal data 3". At step S38 subsequent to step S37, the "dot LCD data" is set, thereby displaying on the screen that "the film used is too old".

At step S39 subsequent to step S37, it is further checked to determine whether or not the "abnormal data 4" is to be applied. When the result of decision at step S37 indicates that the "abnormal data 4" is applicable, then the program flow goes to step S40 at which the dot LCD data in turn is set to display the number of frames left unphotographed. When it is determined at step S39 that no "abnormal data 4" be applicable, the program flow proceeds to step S41 at which a subroutine for an "other data set" is executed.

Figure 25A:
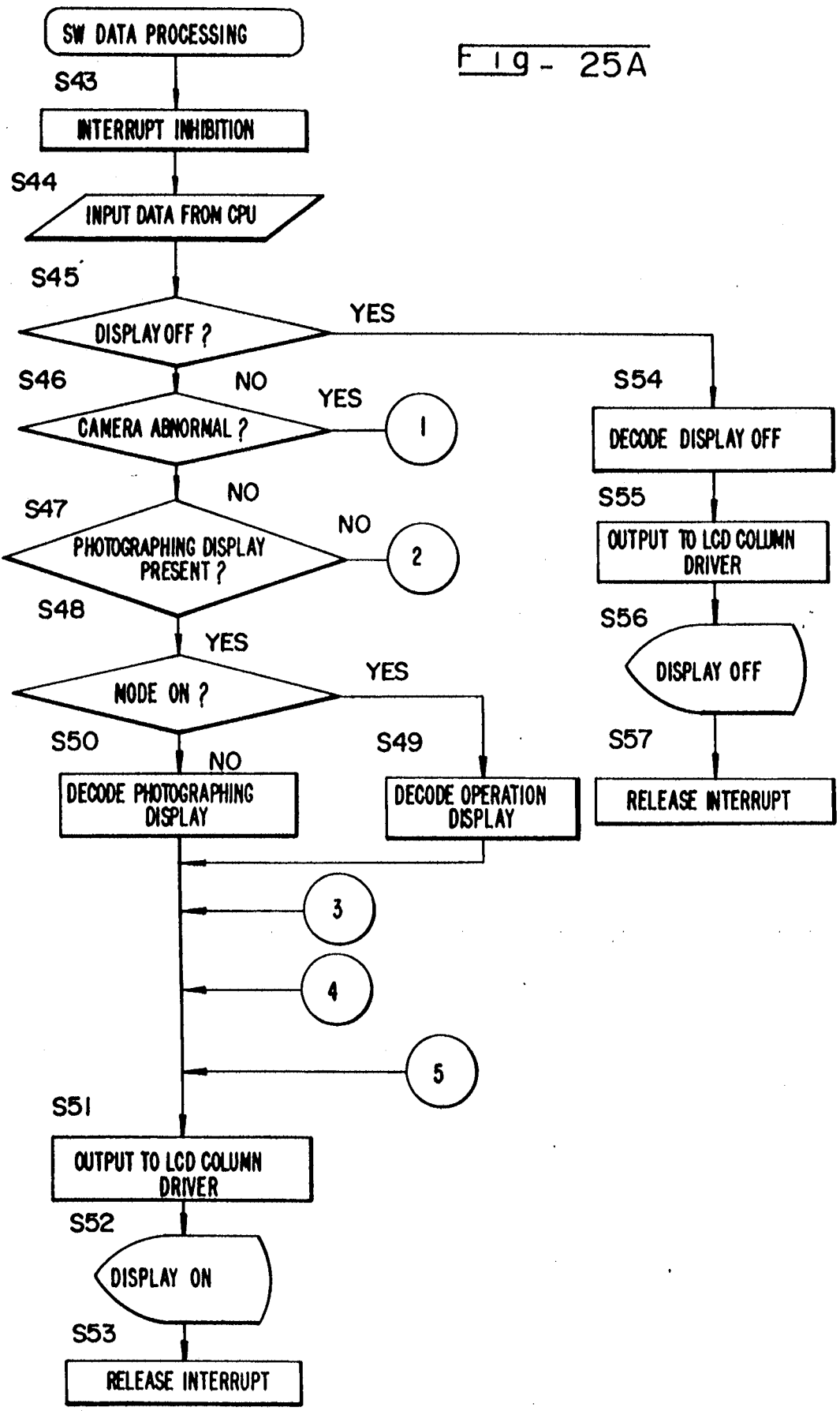

The subroutine for the "switch (SW) data processing" as shown in step S5 will be described with reference to the flowchart of FIG. 25.

When the result of decision at step S5 indicates that there is no abnormality in the camera system, the program flow proceeds to step S43 at which interrupt inhibition is executed, followed by proceeding to step S44 at which data necessary for implementing checking, which follows, is inputted from the CPU 24.

Subsequent to step S44, the program flow proceeds to step S45 at which a decision is made to determine if the display on the screen is to be turned OFF. If the result of decision at step S44 indicates that the display should not be turned OFF, the program flow goes to step S46. If the result of decision at step S44 indicates the display being turned OFF, the program flow proceeds to step S54.

At step S46 subsequent to step S45, a decision is further made to check if something is abnormal in the camera. If the result of the decision at step S45 indicates that there is no abnormality in the camera, then the program flow goes to step S47. If it is determined that something is abnormal, then the program flow proceeds to step S58.

As the program flow proceeds to step S47 when it was checked and determined at step S46 that the camera was not found abnormal, it is further checked to determine whether or not an instruction for displaying the setting of the photographing mode is given. When the result of the decision at step S47 indicates that such an instruction has been given, then the program flow proceeds to step S48. If it is decided at step S47 that no such instruction has been given, the program flow then goes to step S59.

At step S48 subsequent to step S47, a decision is made to determine if the instruction for displaying the settings outputted is given from the mode switch 51. If the result of decision at step S48 indicates that the instruction comes from the mode switch 51, the program flow proceeds to step S50. If the result of decision at step S48 indicates that the instruction does not come from the mode switch 51, the program flow goes to step S49 at which the data relating to the operation display is decoded.

At step S50 subsequent to step S48, the data concerning the display relating to photographing is decoded. This data is decoded and the decoded data is outputted toward the column drivers 38a and 38b at step S51, followed by proceeding to step S52 at which the data concerning the photographing is displayed on the screen of the dot LCD 23. Then the program flow proceeds to step S53 at which the "interrupt inhibition" executed at step S43 is released.

When the program flow proceeded to step S54 as a result of the decision at step S45 that the screen display is turned OFF, the data for turning the display of the dot LCD 23 is turned OFF is decoded, and the program flow goes to step S55 at which this data is outputted to the LCD column drivers 38a and 38b, followed by proceeding to step S56 at which the display of the dot LCD 23 is turned OFF and then to step S57 at which the "interrupt inhibition" as set at step S43 is released.

At step S59 subsequent to step S47, a decision is made to determine whether or not an instruction for displaying the settings as to the operating mode. When the result of decision at step S59 indicates that the instruction be outputted, the program flow goes to step S60. When the result of decision at step S59 indicates that the instruction should not be outputted, the program flow proceeds to step S64.

At step S60, a decision is made for the purpose of determining if the mode switch 51 is in an ON state, followed by proceeding to step S61, when the mode switch 51 is turned ON, at which the data concerning the operating data is decoded, and followed by proceeding to step S51. If the result of decision at step S60 indicates that the mode switch 51 is not turned ON, then the program flow proceeds to step S62.

At step S62, a decision is made to determine if the BACK switch 52 is turned ON. When the result of decision at step S62 indicates that the BACK switch 52 is turned ON, the program flow proceeds to step S63 at which the data regarding the display of photographing is decoded, followed by proceeding to step S51. When the result of decision at step S62 indicates that the BACK switch 52 is turned OFF, the program flow goes to step S91 at which a subroutine for "operation selection" is executed, followed by proceeding to step S51.

When the result of decision at step S59 indicates that the display instruction for the operation mode is not outputted, then the program flow goes to step S64 at which the "mode display" is checked. The program flow proceeds to step S65 when it is decided at step S64 that the mode display is executed. If not, the program flow proceeds to step S67 at which a subroutine for the "data setting" is executed, followed by advancing to step S51.

At step S65 subsequent to step S64, a decision is made to determine if the BACK switch 52 is in an ON state. If the result of the decision at step S65 indicates that the BACK switch 52 is in an OFF state, the program flow proceeds to step S66 at which a subroutine for "mode selection is executed, followed by proceeding to step S51. On the other hand, if the result of the decision at step S65 indicates that the BACK switch 52 is in ON state, the program flow goes to step S68 at which the data relating to the operation display is decoded, followed by proceeding to step S51.

Figure 26:
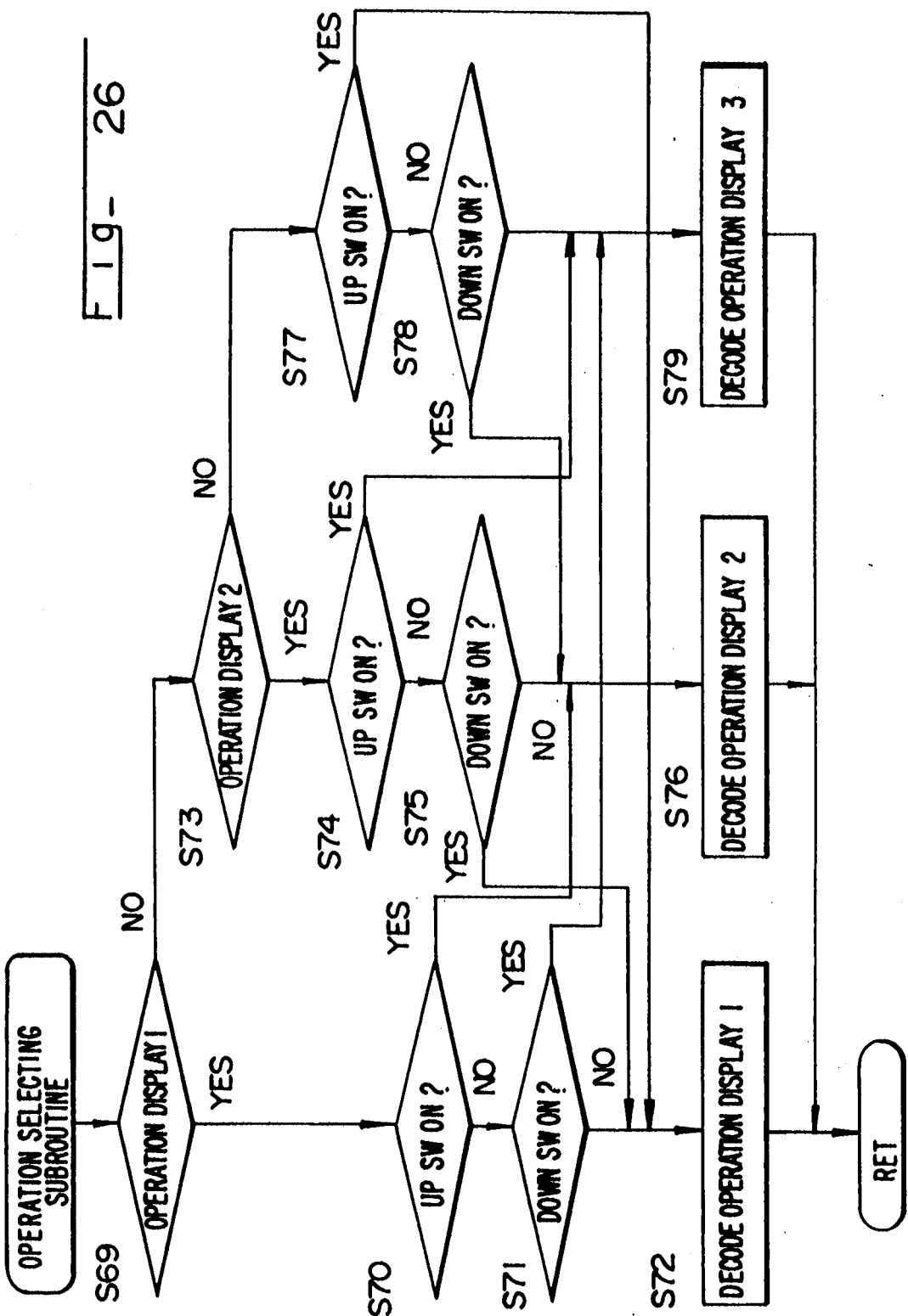
FIG. 26 is a flow chart showing the operation of "operation selecting".

Referring to FIG. 26, description will be made of the subroutine for the "operation selection" as described hereinabove.

First, at step S69, a decision is made to determine if "operation display 1" is executed. The program flow proceeds to step S70 when the result of decision at step S69 indicates that the "operation display 1" is to be executed, while the program flow proceeds to step S73 when the result of decision at step S69 indicates that the "operation display 1" is not to be executed.

Then, at step S70, a decision is made to determine whether or not the UP switch 76 is turned ON. If the result of decision at step S70 indicates that the UP switch 76 is in an OFF state, on the one hand, the program flow proceeds to step S71. If it is decided at step S70 that the UP switch 76 is turned ON, the program flow then goes to step S76.

At step S71 subsequent to step S70, a further decision is made to determine whether or not the DOWN switch 77 is in an ON state. If it is decided at step S71 that the DOWN switch 77 is turned OFF, on the one hand, then the program flow proceeds to step S72 at which data relating to the "operation display 1" is decoded, followed by the return of the program flow. If the result of decision at step S71 indicates that the DOWN switch 77 is in an ON state, on the other hand, then the program flow goes to step S79.

When it is decided at step S69 that the data concerning the "operation display 1" is not to be executed, then the program flow goes to step S73 at which a decision is made to determine if data relating to "operation display 2" is to be executed. When it is decided at step S73 that the data on the "operation display 2" be executed, the program flow goes to step S74. On the contrary, when the result of decision at step S73 indicates that the data concerning the "operation display 2" is not to be executed, then the program flow proceeds to step S77.

At step S74 subsequent to step S73, a decision is further made to determine if the UP switch 76 is in an ON state. When the result of decision at step S74 indicates that the UP switch 76 is in ON state, then the program flow goes to step S79 at which processing is executed in such a manner as will be described hereinafter. When it is decided at step S74 that the UP switch 76 is turned OFF, then the program flow goes to step S75 at which a decision in turn is made to determine whether the DOWN switch 77 is in an ON state. If the result of decision at step S75 indicates that the DOWN switch 75 is in ON state, on the one hand, then the program flow proceeds to step S72. If the result of decision at step S75 indicates that the DOWN switch is turned OFF, on the other hand, then the program flow goes to step S76 at which the data relating to the "operation display 2" is decoded, followed by the return of the program flow.

When the program flow goes to step S77 subsequent to step S73, a decision is made to determine if the UP switch 76 is in an ON state. If it is decided at step S77 that the UP switch 76 is in ON state, then the program flow goes to step S72 at which the data on the "operation display 1" is decoded. If the result of decision at step S77 indicates that the UP switch 76 is turned OFF, the program flow goes to step S78 at which a decision is made to determine whether the DOWN switch 77 is in ON state.

At step S78, if the result of decision indicates that the DOWN switch 77 is turned ON, then the program flow advances to step S76 at which the data on the "operation display 2" is decoded, followed by the return of the program flow. On the other hand, if the result of decision at step S78 indicates that the DOWN switch 77 is turned OFF, then the program flow goes to step S79 at which data relating to "operation display 3" is decoded, followed by the return of the program flow.

Figure 27:
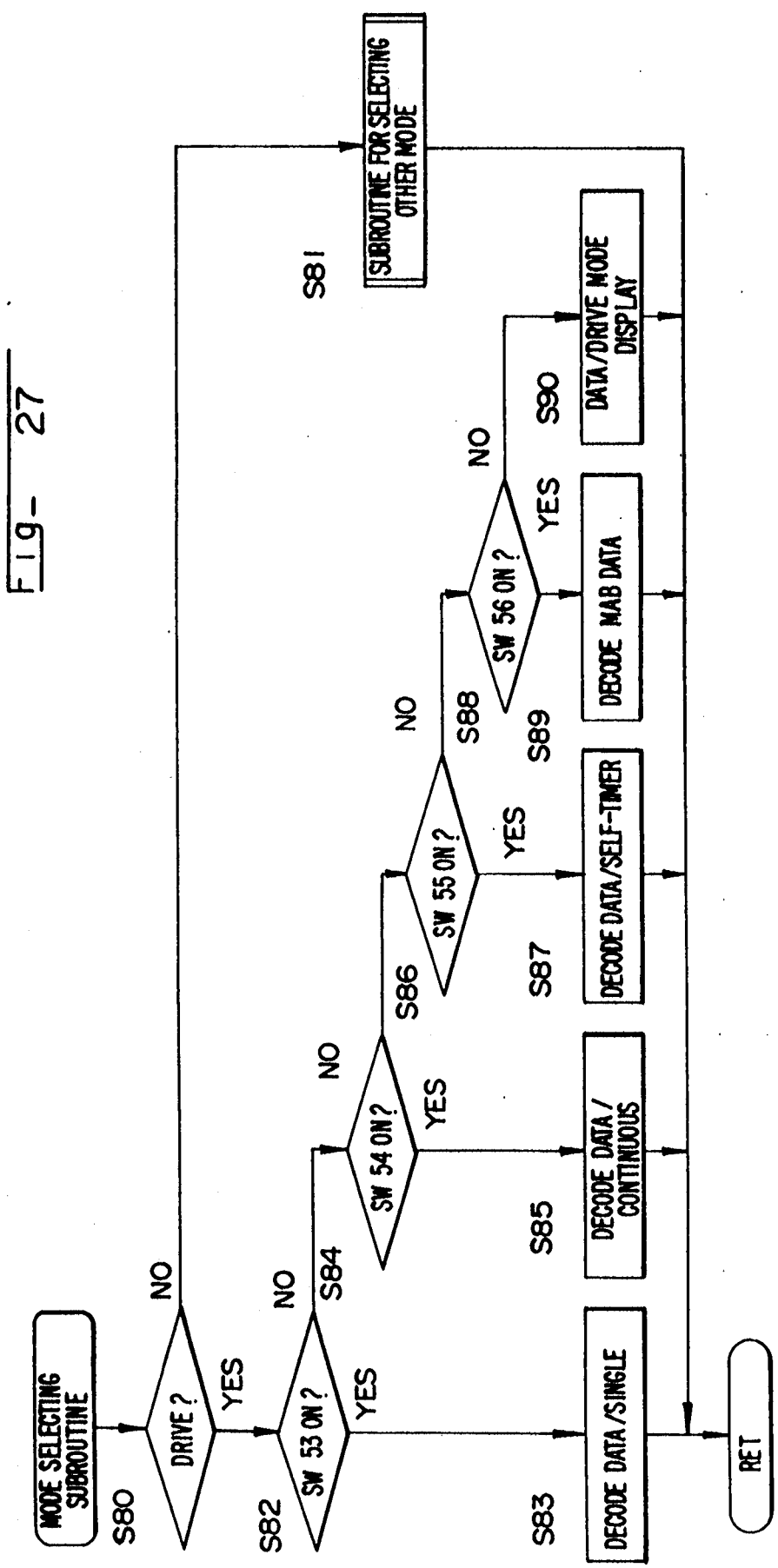
FIG. 27 is a flow chart showing the operation of "mode selecting".

Description will now be made on the subroutine for the "mode selection" as indicated in step S66 with reference to FIG. 27.

At step S80 of the "mode selection subroutine", a decision is made to determine if the MODE switch 51 is turned ON. If it is decided at step S80 that the MODE switch 51 is in ON state, then the program flow goes to step S82, while the program flow goes to step S81 at which a subroutine for selecting other modes are executed, when the result of the decision at step S80 indicates that the MODE switch 51 is in OFF state.

When the program flow proceeds to step S82 subsequent to step S80, it is further decided whether or not the operating switch 53 is in an ON state. If the result of decision at step S82 indicates that the operating switch 53 in in ON state, the program flow goes to step S83 and data relating to "single photographing mode" is displayed followed by the return of the program flow. If the result of decision at step S82 indicates that the operating switch 53 is in OFF state, the program flow goes to step S84.

At step S84, it is decided if the operating switch 54 is in an ON state. If the result of decision at step 84 indicates that the operating switch 54 is in ON state, then the program flow goes to step S85 and data concerning "continuous photographing mode" is displayed followed by the return of the program flow. If it is decided at step S84 that the operating switch 54 is in an OFF state, then the program flow proceeds to step S86.

At step S86, a decision is made to determine if the operating switch 55 is turned ON. If it is decided at step S86 that the operating switch 55 is in an ON state, then the program flow proceeds to step S87 and data relating to the "self-timer mode" is displayed, followed by the return of the program flow. If the result of decision at step S86 indicates that the operating switch 55 is in an OFF state, then the program flow goes to step S88 at which a decision is further made to determine if the operating switch 56 is turned ON. If the result of decision at step S88 indicates that the operating switch 56 is in the ON state, the program flow then goes to step S89 at which data concerning the "MAB mode" is displayed, followed by the return of the program flow. If the decision at step S88 results in a determination that the operating switch 56 is in an OFF state, then the program flow proceeds to step S90.

At step S90, data regarding the "drive mode" is displayed, and then the program flow is returned.

Although the display system according to the present invention has been described hereinabove by taking as an example a conventional still camera to which the present invention is applied, it is to be understood as a matter of course that the display system according to the present invention can be applied to a camera of other types, such as an electronic still camera and a video camera.

I claim:

1. A display system of a camera for displaying information relating to the camera on a display unit disposed in a main body of the camera, wherein:
    the information is divided into sub-title data to be displayed by a plurality of sub-titles and data subordinate to the sub-title data; and which comprises:
    information display changeover means comprising means for selecting sub-title data and subordinate data and means for selectively displaying the sub-title data or the subordinate data on the display unit.

2. A display system as claimed in claim 1, wherein the sub-title data is one of plural pieces of information which is provided by dividing the photographing data into plural and different types of data, and the sub-title data includes data subordinate to the sub-title data.

3. A display system as claimed in claim 1, further comprising division display means for dividing the display unit into a plurality of sections and displaying the sub-title data on each of the sections.

4. A display system as claimed in claim 3, wherein the number of the sub-title data is more than the number of the sections that the display unit is divided by the division display means.

5. A display system as claimed in claim 4, further comprising a sub-title changing means for changing the sub-title whose number of the sub-title data is more than the number of the divided sections of the display.

6. A display system as claimed in claim 3, wherein a plurality of the sub-title data are displayed on a plurality of the divided sections at the same time.

7. A display system as claimed in claim 5, wherein one of the plurality of sub-ordinate data of the sub-title data is displayed on the divided section on the display by an operation of the information display changeover means instead of the sub-title data which was indicated just before the operation of the information display changeover means.

8. A display system as claimed in claim 3, further comprising full display means for displaying the display unit divided by the division display means as a one full screen.

9. A display system as claimed in claim 8, further comprising sub-title selecting means for selecting either one of the sub-title data displayed by the division display means.

10. A display system as claimed in claim 9, further comprising screen changeover means for displaying data subordinate to the sub-title data selected by the sub-title selecting means on the display unit through the full display means when the sub-title selecting means selects either of the sub-title data.

11. A display system as claimed in claim 1, wherein the information display changeover means is composed of an up-switch, a down-switch and an operation switch.

12. A display system as claimed in claim 3, wherein the display unit comprises a dot liquid crystal display and is divided into four sections defined as a first to a fourth sections.

13. A display system as claimed in claim 3, wherein the information display changeover means is disposed to correspond to each of the divided sections of the display.

14. A display system as claimed in claim 3, wherein the display unit comprises a dot liquid crystal display and is divided into two section defined as a first and a second sections by the division display means.

15. A display system of a camera for displaying information relating to the camera on a display unit disposed in a main body of the camera, wherein:

the information is divided into sub-title data to be displayed by a plurality of sub-titles and subordinate data that is subordinate to the sub-title data; and which comprises: division display means for dividing the display unit into a plurality of sections and displaying the sub-title data on each of the sections;

full display means for displaying the display unit divided by the division display means as a one full screen;

sub-title selecting means for selecting either one of the sub-title data displayed by the division display means; and screen changeover means for displaying data subordinate to the sub-title data selected by the sub-title selecting means on the display unit through the full display means when the sub-title selecting means selects either of the sub-title data.

16. A display system as claimed in claim 15, wherein the sub-title data is one of plural pieces of information which is provided by dividing the photographing data into plural and different types of data, and the sub-title data includes the data subordinate to the sub-title data.

17. A display system as claimed in claim 15, further comprising sub-title changing means for altering a sub-title to be displayed in such a manner that the number of the sub-title data is more than the number of the sections of the display unit divided by the division display means.

18. A display system as claimed in claim 15, wherein the display unit comprises a dot liquid crystal display and is divided into four sections defined as a first to a fourth section and an operating switch for operating the sub-title selecting means is disposed so as to correspond to each of the four sections.

19. A display system as claimed in claim 15, wherein the display unit comprises a dot liquid crystal display and is divided into two sections by the division display means.

20. The display system of a camera according to claim 1, said means for displaying comprising means for displaying said subtitle data and said subordinate data in alternative fashion superimposed in a common display area of said display unit.

* * * * *

UNITED STATES PATENT AND TRADEMARK OFFICE
CERTIFICATE OF CORRECTION

PATENT NO. : 5,191,373
DATED : March 2, 1993
INVENTOR(S) : Satoshi NAKANO

It is certified that error appears in the above-indentified patent and that said Letters Patent is hereby corrected as shown below:

On the cover page item [54], (Title), lines 2 and 3, delete "DISPLAY SYSTEM OF A CAMERA".

On the cover page item [56], "References Cited", under "U.S PATENT DOCUMENTS", insert ---4,903,062 2/1990 Kirigaya 354/289.1---.

On the cover page item [56], "References Cited", under "U.S PATENT DOCUMENTS", insert ---4,712,904 12/1987 Taniguchi et al. 354/475---.

On the cover page item [56], "References Cited", under "U.S PATENT DOCUMENTS", insert ---4,461,560 6/1984 Yoshino et al. 354/475---.

On the cover page item [56], "References Cited", under "FOREIGN PATENT DOCUMENTS", insert ---2181930 4/1987 United Kingdom---.

On the cover page item [56], "References Cited", under "FOREIGN PATENT DOCUMENTS", insert ---2121196 12/1983 United Kingdom---.

On the cover page item [56], "References Cited", under "FOREIGN PATENT DOCUMENTS", insert ---2046929 11/1980 United Kingdom---.

At column 25, line 41 (claim 14, line 3) change "section" to ---sections---.

At column 25, line 42 (claim 14, line 4) change "sections" to ---section---.

Signed and Sealed this

Sixteenth Day of April, 1996

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,191,373
DATED : March 2, 1993
INVENTOR(S) : S. NAKANO

It is certified that error appears in the above-indentified patent and that said Letters Patent is hereby corrected as shown below:

At column 24, line 48, (claim 1, line 6) insert --- and functionally related--- after "subordinate".

Signed and Sealed this

Sixteenth Day of July, 1996

Attest:

BRUCE LEHMAN

Attesting Officer     Commissioner of Patents and Trademarks